United States Patent
Kunze

(10) Patent No.: US 9,552,624 B2
(45) Date of Patent: Jan. 24, 2017

(54) METHOD AND DEVICE FOR CREATING AN IMPROVED COLOR IMAGE WITH A SENSOR WITH A COLOR FILTER

(71) Applicant: BASLER AG, Ahrensburg (DE)

(72) Inventor: Jörg Kunze, Ahrensburg (DE)

(73) Assignee: BASLER AG, Ahrensburg (DE)

(*) Notice: Subject to any disclaimer, the term of this patent is extended or adjusted under 35 U.S.C. 154(b) by 0 days.

(21) Appl. No.: 14/759,996

(22) PCT Filed: Jan. 10, 2014

(86) PCT No.: PCT/EP2014/050408
§ 371 (c)(1),
(2) Date: Jul. 9, 2015

(87) PCT Pub. No.: WO2014/108512
PCT Pub. Date: Jul. 17, 2014

(65) Prior Publication Data
US 2015/0356710 A1    Dec. 10, 2015

(30) Foreign Application Priority Data

Jan. 10, 2013 (DE) .................. 10 2013 000 301

(51) Int. Cl.
*G06T 3/40* (2006.01)
*H04N 5/225* (2006.01)
(Continued)

(52) U.S. Cl.
CPC .......... *G06T 3/4015* (2013.01); *G06T 3/4007* (2013.01); *G06T 5/003* (2013.01); *G06T 7/0004* (2013.01);
(Continued)

(58) Field of Classification Search
CPC ................. G06T 3/4015; G06T 3/4007; G06T 2207/30108; G06T 7/408; G06T 7/0004; G06T 2207/10024; G06T 5/003; H04N 5/2254; H04N 9/045; H04N 2209/046
(Continued)

(56) References Cited

U.S. PATENT DOCUMENTS

| | | |
|---|---|---|
| 3,971,065 A | 7/1976 | Bayer |
| 5,251,019 A | 10/1993 | Moorman et al. |

(Continued)

FOREIGN PATENT DOCUMENTS

| | | |
|---|---|---|
| DE | 1 160 001 A | 12/1963 |
| DE | 10 2010 052438 A1 | 5/2010 |

(Continued)

OTHER PUBLICATIONS

International Search Report dated Apr. 22, 2014 corresponding to International Patent Application No. PCT/EP2014/050408 and English translation thereof.

(Continued)

*Primary Examiner* — Christopher S Kelley
*Assistant Examiner* — Zhihan Zhou
(74) *Attorney, Agent, or Firm* — Squire Patton Boggs (US) LLP

(57) ABSTRACT

The invention relates to an image processing device for processing image data from a digital camera comprising an image sensor with a regular pixel arrangement and an associated color filter with a predetermined color pattern. Said image processing device is designed to carry out all image processing operations with respect to a pixel of interest using image data from a single predetermined environment comprising several pixels.

16 Claims, 20 Drawing Sheets

(51) Int. Cl.
*H04N 9/04* (2006.01)
*G06T 5/00* (2006.01)
*G06T 7/40* (2006.01)
*G06T 7/00* (2006.01)

(52) U.S. Cl.
CPC ............ *G06T 7/408* (2013.01); *H04N 5/2254* (2013.01); *H04N 9/045* (2013.01); *G06T 2207/10024* (2013.01); *G06T 2207/30108* (2013.01); *H04N 2209/046* (2013.01)

(58) Field of Classification Search
USPC .......................................................... 348/91
See application file for complete search history.

(56) References Cited

U.S. PATENT DOCUMENTS

| | | | |
|---|---|---|---|
| 5,631,703 | A | 5/1997 | Hamilton, Jr. et al. |
| 6,181,376 | B1 | 1/2001 | Rashkovskiy et al. |
| 6,330,029 | B1 | 12/2001 | Hamilton et al. |
| 6,819,801 | B2 | 11/2004 | Kakarala et al. |
| 7,057,654 | B2 | 6/2006 | Roddy et al. |
| 2006/0033824 | A1* | 2/2006 | Nicholson ............... H04N 5/272 348/265 |
| 2006/0098868 | A1 | 5/2006 | Fainstain et al. |
| 2008/0099663 | A1 | 5/2008 | Kunze |
| 2008/0252657 | A1* | 10/2008 | Watanabe ................ G09G 5/02 345/601 |
| 2008/0252759 | A1* | 10/2008 | Jerdev .................... H04N 9/045 348/273 |
| 2008/0273793 | A1 | 11/2008 | Oishi |
| 2010/0085452 | A1 | 4/2010 | Hirakawa et al. |
| 2010/0156921 | A1* | 6/2010 | McLennan ........... G06K 9/4652 345/589 |
| 2010/0310162 | A1* | 12/2010 | Chan .................... G06T 3/4015 382/167 |
| 2011/0148912 | A1* | 6/2011 | Marcu ..................... G09G 5/02 345/601 |

FOREIGN PATENT DOCUMENTS

| | | |
|---|---|---|
| DE | 10 2010 003039 A1 | 9/2011 |
| EP | 1 919 197 A2 | 5/2008 |
| EP | 2 383 974 B1 | 10/2012 |
| EP | 2 584 782 A1 | 4/2013 |
| GB | 1015159 | 12/1965 |
| JP | S60-502034 A | 11/1985 |
| JP | 111-225343 A | 8/1999 |
| JP | 2005-117540 A | 4/2005 |
| JP | 2008-278288 A | 11/2008 |
| WO | 85/00949 A1 | 2/1985 |
| WO | 20111158572 A1 | 12/2011 |

OTHER PUBLICATIONS

Japanese Office Action application No. 2015-552057 dated Dec. 4, 2015.

German Office Action application No. 102013000301.6 dated Sep. 17, 2013.

German Office Action application No. 102013000301.6 dated Jul. 28, 2014.

\* cited by examiner a)                                  b)

| R | G | R | G | R | G |
|---|---|---|---|---|---|
| G | B | G | B | G | B |
| R | G | R | G | R | G |
| G | B | G | B | G | B |

| R | Gr | R | Gr | R | Gr |
|---|----|---|----|---|----|
| Gb | B | Gb | B | Gb | B |
| R | Gr | R | Gr | R | Gr |
| Gb | B | Gb | B | Gb | B | a) 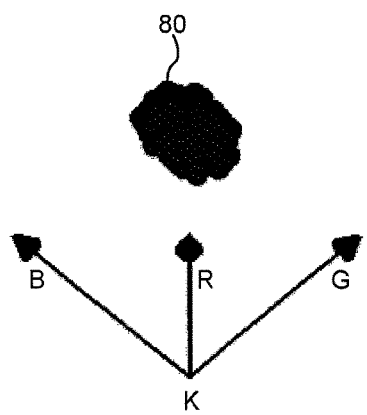
b) 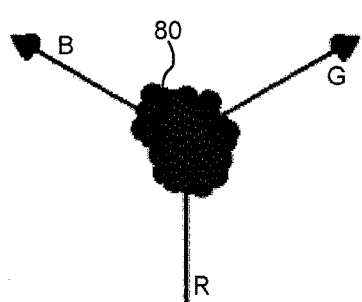
c) 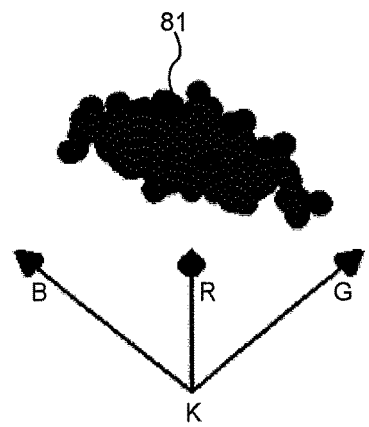
d) 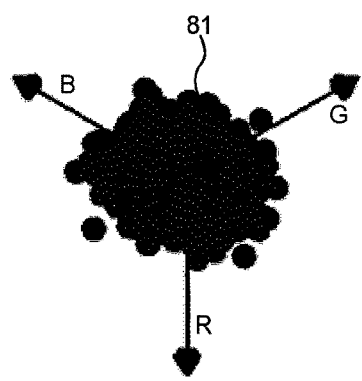
Fig. 7

$$FR1cR = \frac{1}{16} \begin{array}{|c|c|c|c|c|} \hline 1 & & 2 & & 1 \\ \hline & & & & \\ \hline 2 & & 4 & & 2 \\ \hline & & & & \\ \hline 1 & & 2 & & 1 \\ \hline \end{array} = FB1cB$$

$$FG1cR = \frac{1}{16} \begin{array}{|c|c|c|c|c|} \hline & 1 & & 1 & \\ \hline 1 & & 2 & & 1 \\ \hline & 2 & & 2 & \\ \hline 1 & & 2 & & 1 \\ \hline & 1 & & 1 & \\ \hline \end{array} = FG1cB$$

$$FB1cR = \frac{1}{4} \begin{array}{|c|c|c|c|c|} \hline & & & & \\ \hline & 1 & & 1 & \\ \hline & & & & \\ \hline & 1 & & 1 & \\ \hline & & & & \\ \hline \end{array} = FR1cB$$

$$FR1cGr = \frac{1}{8} \begin{array}{|c|c|c|c|c|} \hline & 1 & & 1 & \\ \hline & & & & \\ \hline & 2 & & 2 & \\ \hline & & & & \\ \hline & 1 & & 1 & \\ \hline \end{array} = FB1cGb$$

$$FG1cGr = \frac{1}{32} \begin{array}{|c|c|c|c|c|} \hline 1 & & 2 & & 1 \\ \hline & 4 & & 4 & \\ \hline 2 & & 4 & & 2 \\ \hline & 4 & & 4 & \\ \hline 1 & & 2 & & 1 \\ \hline \end{array} = FG1cGb$$

$$FB1cGr = \frac{1}{8} \begin{array}{|c|c|c|c|c|} \hline & & & & \\ \hline 1 & & 2 & & 1 \\ \hline & & & & \\ \hline 1 & & 2 & & 1 \\ \hline & & & & \\ \hline \end{array} = FR1cGb$$

Fig. 16

$$FGScR = \frac{1}{16} \begin{array}{|c|c|c|c|c|} \hline & -1 & & -1 & \\ \hline -1 & & 2 & & -1 \\ \hline & 2 & & 2 & \\ \hline -1 & & 2 & & -1 \\ \hline & -1 & & -1 & \\ \hline \end{array} = FGScB$$

$$FGScGr = \frac{1}{32} \begin{array}{|c|c|c|} \hline -1 & -2 & -1 \\ \hline -2 & 12 & -2 \\ \hline -1 & -2 & -1 \\ \hline \end{array} = FGScGb$$

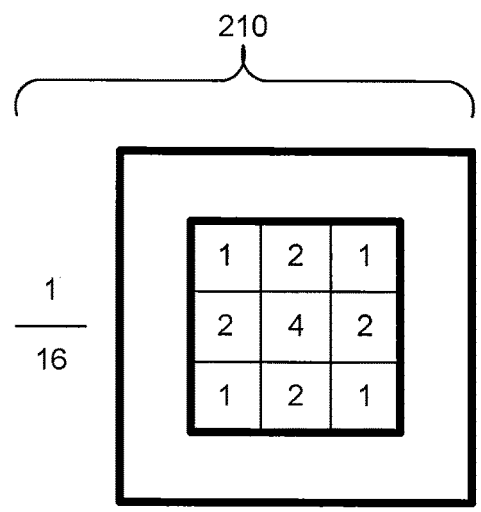
Fig. 23
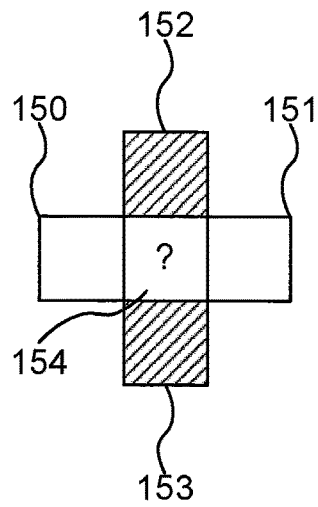
Fig. 24
Fig. 25

$$FR2cR = \begin{array}{|c|c|c|c|c|}\hline & & & & \\\hline & & & & \\\hline & & 1 & & \\\hline & & & & \\\hline & & & & \\\hline\end{array} = FB2cB$$

$$FR2cGr = \frac{1}{2} \begin{array}{|c|c|c|c|c|}\hline & & & & \\\hline & & & & \\\hline & 1 & & 1 & \\\hline & & & & \\\hline & & & & \\\hline\end{array} = FB2cGb$$

$$FR2cGb = \frac{1}{2} \begin{array}{|c|c|c|c|c|}\hline & & & & \\\hline & & 1 & & \\\hline & & & & \\\hline & & 1 & & \\\hline & & & & \\\hline\end{array} = FB2cGr$$

$$FR2cB = \frac{1}{4} \begin{array}{|c|c|c|c|c|}\hline & & & & \\\hline & 1 & & 1 & \\\hline & & & & \\\hline & 1 & & 1 & \\\hline & & & & \\\hline\end{array} = FB2cR$$

Fig. 30

| 1 | 4 | 8 | 12 | 14 | 12 | 8 | 4 | 1 |
|---|---|---|---|---|---|---|---|---|
| 4 | 16 | 32 | 48 | 56 | 48 | 32 | 16 | 4 |
| 8 | 32 | 64 | 96 | 112 | 96 | 64 | 32 | 8 |
| 12 | 48 | 96 | 144 | 168 | 144 | 96 | 48 | 12 |
| 14 | 56 | 112 | 168 | 196 | 168 | 112 | 56 | 14 |
| 12 | 48 | 96 | 144 | 168 | 144 | 96 | 48 | 12 |
| 8 | 32 | 64 | 96 | 112 | 96 | 64 | 32 | 8 |
| 4 | 16 | 32 | 48 | 56 | 48 | 32 | 16 | 4 |
| 1 | 4 | 8 | 12 | 14 | 12 | 8 | 4 | 1 |

$\dfrac{1}{4096}$

METHOD AND DEVICE FOR CREATING AN IMPROVED COLOR IMAGE WITH A SENSOR WITH A COLOR FILTER

FIELD OF INVENTION

The invention relates to a device and a method for image creation by means of a camera, in particular a digital industrial camera, with a sensor with a color filter.

BACKGROUND OF THE INVENTION

In the industrial environment, digital cameras are often used to monitor production processes, machines or objects. Such industrial cameras are used for simple monitoring functions and for metrological tasks such as quality control by image processing, for example. They are distinguished by their ability for integration into arrangements and their high image quality.

Bayer sensor is the name of a sensor which—similar to a checkerboard—is covered by a color filter, which in most cases consists of 50% green and 25% red and blue each. In doing so, it is considered that the human eye reacts more sensitive to green than to other colors. Many conventional CCD sensors in digital photo and film cameras apply the concept of the Bayer matrix (or Bayer pattern). The "Bayer" matrix or "Bayer" filter is named after the inventor, Bryce E. Bayer, and is explained in more detail in the U.S. Pat. No. 3,971,065.

Light-sensitive cells of a semiconductor material of an image sensor can detect luminescence values only. To obtain color information, a tiny color filter in one of the three basic colors red, green or blue is arranged in front of each single cell. The filters are applied in the order green-red-green-red in odd rows and in the order blue-green-blue-green in even rows, for example. Each light-sensitive cell (pixel) of the image sensor, which has such a filter, correspondingly delivers information for a single color component at this position only. However, to obtain a full color image, a color value is required for each pixel, which consists of several color components, red, green and blue, for example. If a full color image having the same dimensions and the same resolution is to be generated, interpolation of missing color information from values of neighboring pixels is required. Thus, 50% of the green values of a color image are calculated, for blue and red it is 75% of the color values each (or, in one row 50% and in the next row 100% of the row), which are to be filled by the calculation. This interpolation is based on the assumption that only little color differences occur between neighboring pixels in the image. However, naturally this does not apply to each image subject. Therefore, strictly speaking, the Bayer sensor offers only a quarter of the virtual resolution taking into consideration a color image free of artefacts.

FIG. 1 shows an exemplary application of a digital industrial camera. Digital industrial cameras 10 are provided for integration in an industrial apparatus 23, as part of which they detect images of objects 14, 15 or human beings, for example. These images are transferred as image data 16, so that they can be evaluated and/or archived. The evaluation is often done automatically by an image processing means 18. Often, automatized actions are performed in response to the evaluation results, which are in context with the apparatus 23. In this way, bright objects 14 and dark objects 15, which can be discriminated by their color, are automatically sorted based on optical criteria. Such sorting is usual in various industrial sectors. As an example, food, e.g. grain according to the criterion of being free from stain, pieces of ore and rock based on their color or their brightness, postal items based on the address arranged on them, brake discs and sealing rings based on their compliance with a correct shape and their compliance with specific nominal sizes, or empty returnable bottles based on a correct shape and the barcode arranged on them. Such sorting often serves for quality checking and assurance.

Such industrial apparatuses 23 often comprise driving components which feed the objects 14, 15, e.g. a feeding belt 11 with a driving motor 12 and a feeding rate 13. The camera 10 records the image at a suitable position by means of an optics 22, such as an object lens. Thereby, the camera 10 may be arranged as area-scan camera, as row-scan camera or as multiple-row-scan camera, as described in the EP 1 919 197 A2, for example. The camera forwards image signals 16 of the recorded image to the image processing means 18 (e.g., a computer (C)). Furthermore, the image processing means 18 may optionally be supplied with an information 17 about a feeding rate 13 of the feeding belt 11, which may be determined e.g. by a rotary encoder. Thereby, the image processing means can determine a suitable point in time, at which an object passes an actuator 19 such as an element dropping past numerous controllable air injectors, and can supply a control signal 24 thereto, based on which an action is performed, which is suitable to lead the corresponding object to a sorting. As an example, the control of the air injectors can determine whether the object drops into a first container 20 if the airflow is switched off, or is deflected to a second container 21 if the airflow is switched on.

In such an application, it is advantageous if the camera 10 can transfer the image as fast as possible, so that the image processing means 18 can generate the control signal for the actuator 19 as fast as possible and can thus initiate the desired control action at an early stage. Thereby, the apparatus 23 can be operated faster. In certain applications, especially when the objects 14 and 15 move, e.g. roll, on the feeding belt 11, higher accuracy or position can be achieved or other parameters can be optimized.

In other application cases, recording and/or documentation of a circumstance may be of interest, as well. As an example, images of vehicles are recorded, which move disorderly in road traffic, e.g., when violating speed limit or passing red traffic lights—as described in the DE 10 2010 003 039 A1, for example. As an example, loading and unloading of ferryboats may also be accompanied by recording images of vehicles, to be able to determine whether a damage has occurred on the ferryboat in cases of claims for compensation. In such applications, it is required that the color of the objects and certain circumstances, e.g., red traffic lights, are reproduced correctly. Furthermore, it is important that the image has a good quality. This is the case, among others, if the objects of the image can be easily identified and letters, especially such with black and white contrast, are reproduced in a sharp and easily readable manner.

FIG. 2 shows a schematic representation of a structure of a digital camera 10 with an objective 22. An image scene 30 is reproduced via the objective 22 on an image sensor which comprises a regular arrangement of light-sensitive elements (pixels). The image sensor 31 transfers electronic data to a processing unit 32 mostly included in the camera 10, which comprises a processor, a digital signal processor (DSP) or a so-called Field Programmable Gate Array (FPGA), for example. In this case, it may be required that analogue image data is converted into digital image data, e.g., by means of an analogue-to-digital converter (AD-converter). In the processing unit, the image data is converted into a user-applicable form and is then output as an electronic signal 34 via an interface 33.

A user of such a digital color camera often wants to use a color image in which a full color value is available for each pixel position. Such a color value is then understood as a position or position in a color space, wherein the definition of the position in the three-dimensional color space is achieved by an indication of at least three components. The most common color spaces are three-dimensional, e.g. the RGB, sRGB, XYZ, YUV, and L*a*b* color space. Color values of one color space can be translated into color values of another color space, see for example A. Koschan and M. Abidi: "Digital Color Image Processing", John Wiley & Sons, Hoboken 2008, ISBN 978-0-470-14708-5. Furthermore, methods for transmitting color values are known, e.g., as 8-Bit RGB, 12-Bit RGB or YUV 4-2-2.

As each pixel is sensitive for one color only, that is, it delivers one-dimensional information, determination of a color value for this pixel as a value in the three-dimensional color space is under-determined. Therefore, determination of missing information is commonly done by including signals of neighboring pixels, especially such pixels having color masks of another color. A corresponding calculation is called debayring, demosaicing, or color filter array (CFA) interpolation, and is described in the U.S. Pat. No. 6,181,376, for example. As a result of the debayring, a multidimensional color value is obtained for each pixel.

Industrial cameras are known, in which debayring is performed. Also, cameras are provided, which do not transmit images as color values, but as raw data, to a computer. Then, it is required that debayring is performed in the computer. Here, the debayring can be performed on a plug-in card used for receiving image data, a so-called Frame Grabber, or by a processor of the computer or the graphics board. There are also cameras for which a so-called software-implemented driver is offered. It often contains a program code for executing the debayring. It is known that disadvantageous wrong colors may occur when debayring is performed, which is called color aliasing. This problem is extensively discussed in the US 20100085452 A, for example. A proposal for preventing such Color aliasing by a so-called anti-aliasing is described in the U.S. Pat. No. 6,819,801, among others.

For the performance of a digital (industrial) camera, especially speed and image quality are of vital importance. The latter is determined according to the standard EMVA 1288 (www.emva.org) in the current version 3.0. Furthermore, subjective human perception of the image is used by the user as important criterion for judgement of image quality.

Digital industrial cameras are applied in different industrial sectors, e.g., food industry, logistics, transport, automotive industry, robotics and others. Within these industrial sectors there are many further different applications with different requirements, e.g., with respect to the size of the image sensor, the optical resolution given by the number of the pixel, with respect of the repetition rate measured in images per second (fps), and with respect to the data transmission format, e.g., according to the standards CameraLink, IEE 1394, GigE Vision or USB. Digital industrial cameras are known, which achieve high data rates, such as for example CameraLink with up to 800 Mbyte per second or GigE Vision with up to 100 Mbyte per second. To ensure efficient production at such a variety of requirements, such cameras are often arranged modularly, e.g. comprising a sensor module having an image sensor, a processing module and an interface module with an interface. Since the processing module is required to adapt a plurality of different sensor modules and interface modules, it is helpful if it is configurable by software, whereby the variety of types of processing modules and the related effort for development, production and logistics can be reduced. Furthermore, it is required to achieve high data throughput to thereby obtain the high required data rates. In this case, the processing module is often realized by an FPGA as central component.

The number of operations contained in a mathematical image processing method should be as little as possible. In case of an FPGA this leads to a low usage of logic cells, which is advantageous to allow usage of a cheap FPGA or to make available more free logic cells of the FPGA for other functions. In case of a DSP or another processor, a low number of operations means that these can be applied to a higher number of pixels within a given time span, whereby an image output at higher data rate is possible. Also, a low-power and thus cheaper processor can be used due to the lower number of image processing operations, and circuit complexity can thus be reduced.

SUMMARY OF THE INVENTION

It is an object of the invention to provide a camera with a Bayer sensor, which has a low storage requirement and requires little bandwidth for memory access, wherein a high quality image with low latency and high image sharpness can be generated while preventing noise and color aliasing.

According to the invention, this object is achieved by an image processing device according to claim 1, a digital camera according to claim 11, an image processing system according to claim 12, an image processing method according to claim 13, a computer device according to claim 14 and a computer program product according to claim 15.

Accordingly, the solution according to the invention with the image processing process based on a monolithic mathematical method enables image processing at limited resources on the basis of a single predetermined environment of image points, wherein the addition of an identical value to all color components leads to a shift of the color value parallel to the non-color line of the corresponding color space. Thus, an incorporation of noise obtained by the addition does not lead to disadvantageous color noise but only to a non-colored noise.

Furthermore, the low number of image processing operations leads to a low usage of logic cells in the FPGA, so that more free logic cells are available for other functions. In case of a DSP or another processor, a low number of operations means that these can be applied to many pixels within a given time span, whereby a higher data rate is obtained at the output.

According to a first advantageous development, the image processing operations are adapted to determine a correction value based on image data of a first color component (e.g. green color component) of the environment, which is added to the image data of a second and third color component (e.g. red and blue color component) with different sign, respectively.

According to a second advantageous development the image processing operations are adapted to determine the correction value by multiplication by a value determined by convolution of the image data of the first color component by predetermined convolution matrices with a directional estimation value which depends on a preferred orientation of the image structure.

According to a third advantageous development, the image processing operations are adapted to determine the directional estimation value on the basis of a difference of changes of brightness in horizontal and vertical direction within the environment.

According to fourth advantageous development, the image processing operations are adapted to determine a structural information from the image data of a first color component in the environment by means of a convolution matrix, so that a directional dependency of an image structure is coded by the sign.

According to a fifth advantageous development, the image processing operations are adapted to correct a green-green imbalance by offsetting a correction term with the structural information determined from image data of a first color component in the environment.

According to a sixth advantageous development, the image processing operations are adapted to apply a first non-linear function with a first setting value to a first structural information determined from image data of a first color component in the environment, a second non-linear function with a second setting value to a second structural information determined from image data of the first color component in the environment, and to add the results of the first and second non-linear functions so as to obtain a low-noise structural information.

According to a seventh advantageous development, the image processing operations are adapted to perform an image sharpening by multiplication of the structural information determined from image data of a first color component in the environment by a correction value.

BRIEF DESCRIPTION OF THE DRAWING FIGURES

Preferred embodiments of the invention are now explained based on the accompanying figures.

FIGS. 3a and 3b show schematic representations of Bayer patterns;

FIGS. 7a to 7d show schematic representations of different noise clouds in the RGB color space;

FIG. 16 shows exemplary convolution matrices for determining the values R1, G1 and B1 in the phase relationships cR, cGr, cGb and cB;

FIG. 17 shows exemplary convolution matrices for determining the value GS in the phase relationships cR, cGr, cGb and cB;

FIGS. 18a to 18d show schematic representations for explaining the occurrence of wrong colors at small structures;

FIG. 23 shows an exemplary convolution matrix for a direction estimation;

FIG. 24 shows an example of a common basic filter;

FIG. 25 shows a schematic representation for explaining an estimation problem;

FIG. 30 shows exemplary convolution matrices for determining the values A2 and B2 from the respective color value closest to that of the central pixel;

DETAILED DESCRIPTION OF THE EMBODIMENTS

According to the following embodiments, a digital industrial camera with modified and thus more effective image processing is described. Single-color monochromatic cameras as well as multi-color color cameras are used as digital industrial cameras. The recording of color images is often done by using a so-called mosaic filter having a Bayer pattern.

Figure 1:
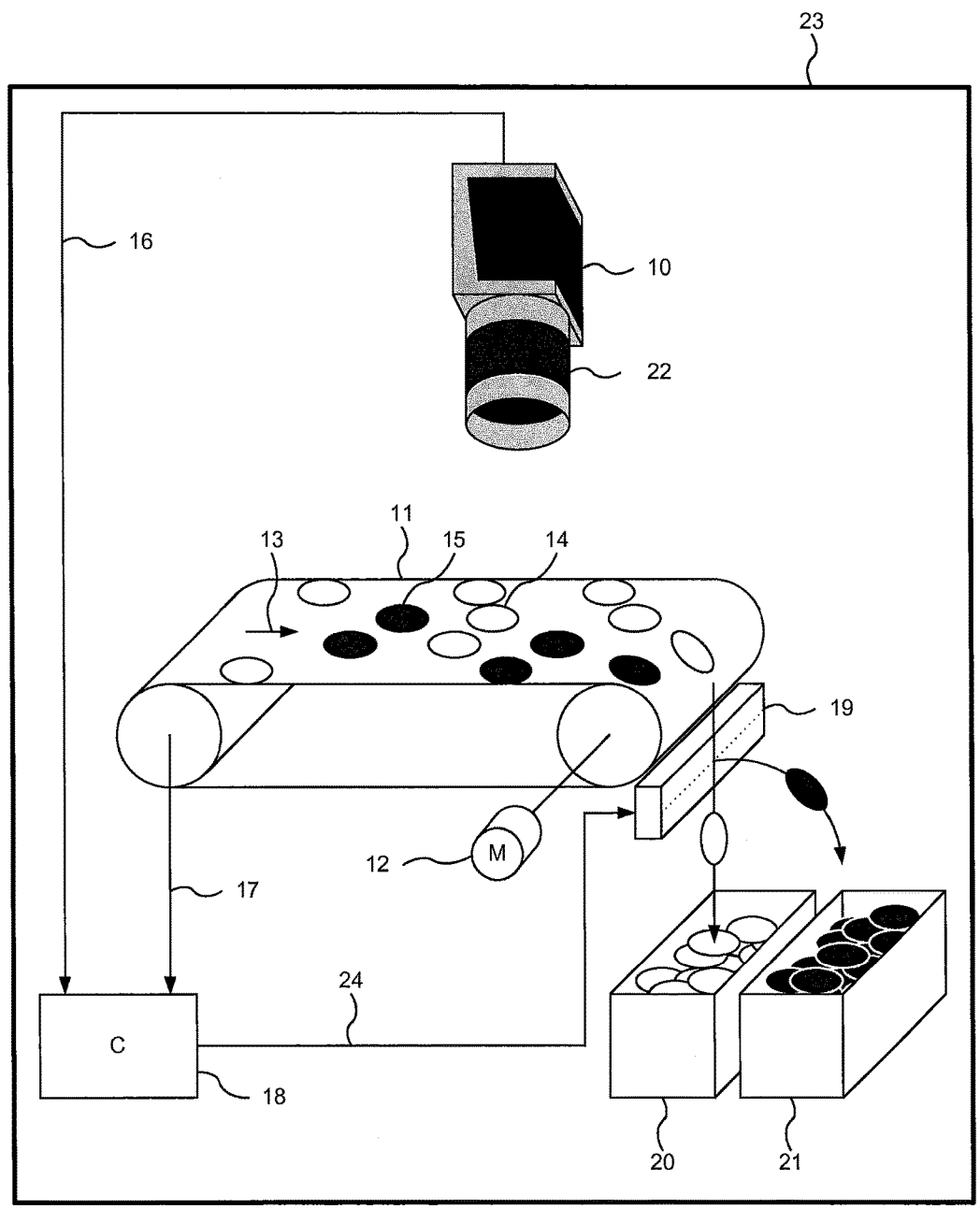
FIG. 1 shows a schematic principle representation of an exemplary application of an industrial camera.
Figures 2, 3:
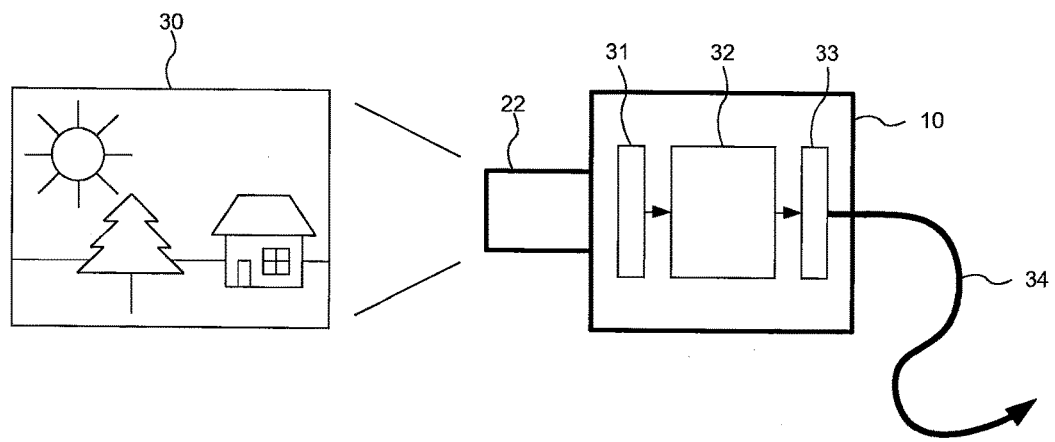
FIG. 2 shows an exemplary structure of a digital industrial camera.

FIGS. 3a and 3b show schematic representations of Bayer patterns. In this case a regular pattern of color filters for the colors red, green and blue is arranged on the pixels according to FIG. 3a, so that each pixel is sensitive for light of the respective color only. Thus, the pixel contributes a signal that corresponds to the intensity of the respective color component within the impinging light. Pixels having a color filter of the color red are called red pixels (R), pixels having a color filter of the color green as green pixels (G), correspondingly, and pixels having a color filter of the color blue as blue pixels (B). In case of a Bayer pattern, the number of green pixels (G) is double the size as the respective number of red pixels (R) or blue pixels (B).

As shown in FIG. 3b, the green pixels can be distinguished into first green pixels (Gr) and second green pixels (Gb), wherein it can be determined by example, without limiting generality, that the first green pixels (Gr) are located in a row of red pixels and the second green pixels (Gb) are located in a row of blue pixels (B).

Figure 4:
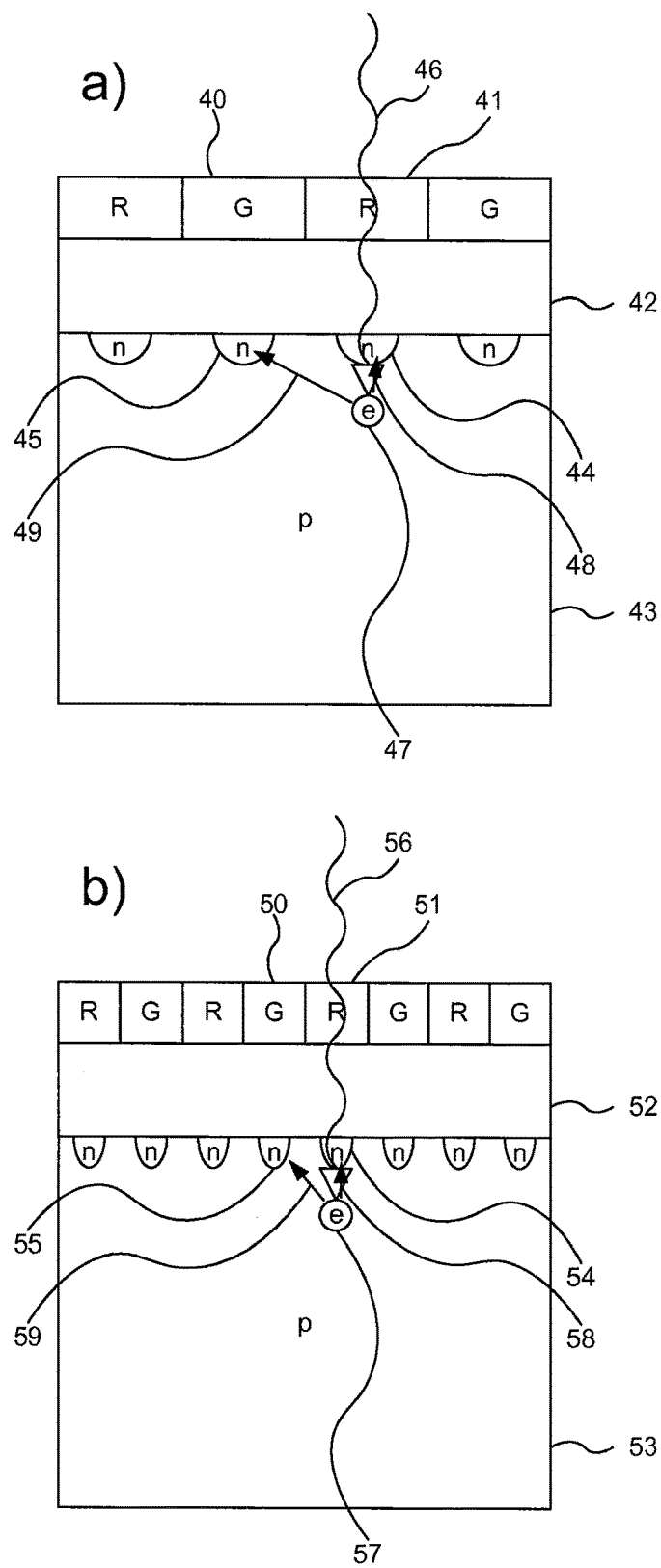
FIGS. 4a and 4b show schematic sectional images of pixels with a color mask with a Bayer pattern at different pixel density.

FIGS. 4a and 4b show schematic sectional images of pixels having a color mask with a Bayer pattern at different pixel densities, wherein more and smaller pixels are provided in FIG. 4b as compared to FIG. 4a.

The image sensors used in a digital industrial camera are generally made of a semiconductor material 43 in FIGS. 4a and 53 in FIG. 4b, silicon in most cases. This semiconductor material comprises doping p and n by which electronic characteristics are provided thereto. In particular, doping areas 44, 45 and 54, 55, respectively, are provided, which are arranged to attract and store free electrons. Commonly, each pixel comprises such a doping area. Above the semiconductor material, an electrical isolation layer 42 and 52, respectively, is provided, into which the electrical connection of the electronic circuit is often embedded. On top of this, a layer with color masks 40, 41 and 50, 51, respectively, is located, which differs at neighboring pixels according to the Bayer pattern. In this way, for example, a pixel with a red color mask, which is for simplicity reasons called "red pixel" here, comprises a doping area 44 or 54, respectively, and a red color mask 41 or 51, respectively, while the neighboring green pixel with the doping area 45 or 55, respectively, comprises a green color mask 40 or 50, respectively. If now red light impinges on the sensor, absorption mainly occurs in the green color filter and transmission in the red color filter. Accordingly, a red photon 46 or 56, respectively, can enter the semiconductor layer 43 or 53, respectively, via the red color mask 41 or 51, respectively, as well as the isolating layer 42 or 52, respectively, arranged below, and can generate there a free photo electron 47 or 57, respectively. This free photo electron is attracted by the nearby doping areas 44, 45 and 54, 55, respectively, wherein the strength of attraction increases with lower distance, and moves to one of the doping areas 44 and 54, respectively, or 45 and 55, respectively, while following a statistical probability determined by the strength of the different attractions and inversely by the length of the different distances.

Due to the fact that increasingly more pixels are integrated per image sensor and moreover the total area of the image sensors becomes ever smaller for cost reasons, the distance of their doping areas 54 and 55 belonging to the pixels in FIG. 4b is smaller than the doping areas 44 and 45 in FIG. 4a, and also the distance of the color masks 50 and 51 in FIG. 4b is less than the distance of the color masks 40 and 41 in FIG. 4a. Thereby, the distance of the photo electron 57 to the doping area of the neighboring pixel 55 becomes smaller as compared to that of the photo electron 47 to the doping area 45. Due to the smaller distance, the strength of the attraction to the neighboring pixel increases and simultaneously the length of the distance decreases. Thereby, the statistical probability that the photo electron 57 generates by the red light 58 wrongly drifts to the doping area 55 (arrow 59) instead of drifting to the correct doping area 54 (arrow 58) increases as compared to the comparison case in FIG. 4a, that the photo electron 47 generated by the red light 48 wrongly drifts to the doping area 54 (arrow 49) instead of drifting to the correct doping area 44 (arrow 48).

The effect that the photo electron wrongly drifts to a neighboring doping area is called "crosstalk" among experts. If now a Bayer pattern is arranged on the sensor, the increasing crosstalk caused by the two above trends leads to an increasing number of photo electrons which are allocated to a wrong color in the neighboring pixel, since in the Bayer pattern horizontally or vertically neighboring pixels do always comprise a different color filter. This leads to a disadvantageous bad color separation.

It is a material property of silicon that red photons with relatively large wavelength have a substantially higher penetration depth than blue photons with a relatively small wavelength. Thereby, it often occurs that the crosstalk generated by red pixels at the same signal intensity is often higher than that caused by blue pixels.

Figure 5:
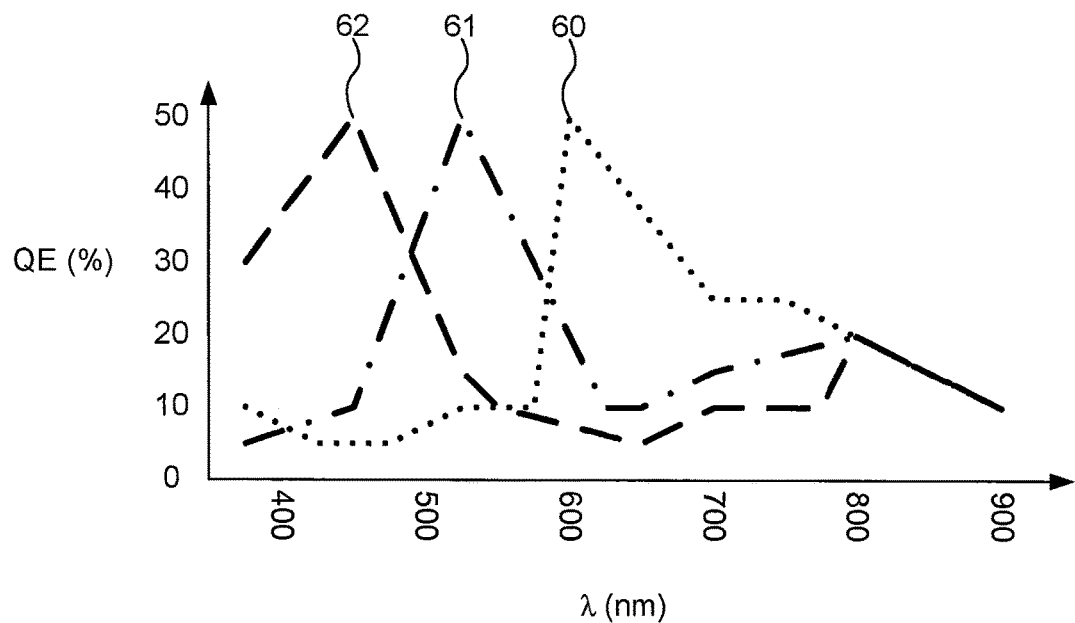
FIG. 5 shows a diagram comprising a quantum efficiency curve of a modern image color sensor with Bayer pattern.

FIG. 5 shows a diagram comprising a quantum efficiency curve of a modern color image sensor with Bayer pattern. In particular, quantum efficiency curves (QE) 60, 61 and 62 for red pixels, green pixels and blue pixels, respectively, are shown. If these curves are compared to the sensitivity curves for human vision, described as X, Y and Z in the CIE Norm Valent System, a serious difference can be determined in particular: the curves shown in FIG. 5 do not show a quantum efficiency of 0 for any wavelength. However, according to the CIE Norm Valent System the quantum efficiency curve 60 for red pixels at wavelengths $\lambda$ of 400 nm and of 500 nm and the quantum efficiency curve 62 for blue pixels at 600 nm and above should be practically zero, for example. The deviation can be explained by the above-mentioned bad color separation.

Due to the bad color separation disadvantageous color errors occur, e.g., a color saturation which is too small. This can be corrected according to EP 2383974 B1 or another known method, for example, e.g. by means of a technically common 3×3 color matrix.

Furthermore, it is possible, depending on the precise design of the image sensor, that crosstalk occurs anisotropically, that is, not the same portion of crosstalk occurs between neighboring pixels in the vertical direction as well as between horizontally neighboring pixels. Here, the terms "vertically neighboring" and "horizontally neighboring" relate to the representation according to FIG. 3.

If it is now assumed that a homogenous bright grey area is recorded by the image sensor with a suitable white balance. Then, the signal of the red pixel is about the same as the signal of the blue pixel, due to the grey color. If the green pixels are generally identical, irrespective of their position and if furthermore the crosstalk between vertically neighboring pixels is higher than between horizontally neighboring pixels, and if the crosstalk generated by red pixels is higher than that generated by blue pixels due to the known larger penetration depth of red photons in silicon as compared to blue photons, the following situation arises: Due to the crosstalk from the red pixels (R) to the first and second green pixels (Gr) and (Gb) their respective signal increases. Since the crosstalk to vertically neighboring pixels is higher than to horizontally neighboring pixels, the signal of the vertically neighboring second green pixel (Gb) increases stronger thereby than the signal of the horizontally neighboring first green pixel (Gr). Similarly, by the crosstalk from the blue pixels (B) to the vertically neighboring first green pixels (Gr) their signal increases a bit stronger than that of the horizontally neighboring second green pixels (Gb), the signal of which increases less. Since according to the assumption, the crosstalk generated by red pixels is higher than that generated by blue pixels, the sum of increases of the signal of the second green pixels (Gb) is stronger than the increase of the signal of the first green pixels (Gr). Thereby, a deviation of the signals of the first and second green pixels (Gr) and (Gb) among each other occurs, which is designated as the so-called "green-green imbalance".

It is known from the standard EMVA 1288 that images of image sensors as well as digital industrial cameras comprise a noise having a characteristic as described therein. This noise is influenced by the application of mathematical correction processes, such as the debayring and the correction of color errors, and is mostly amplified. In this case, the signal of pixels and a color value, respectively, can be interpreted as measurement value, and the noise can be interpreted as measurement error.

Figure 6:
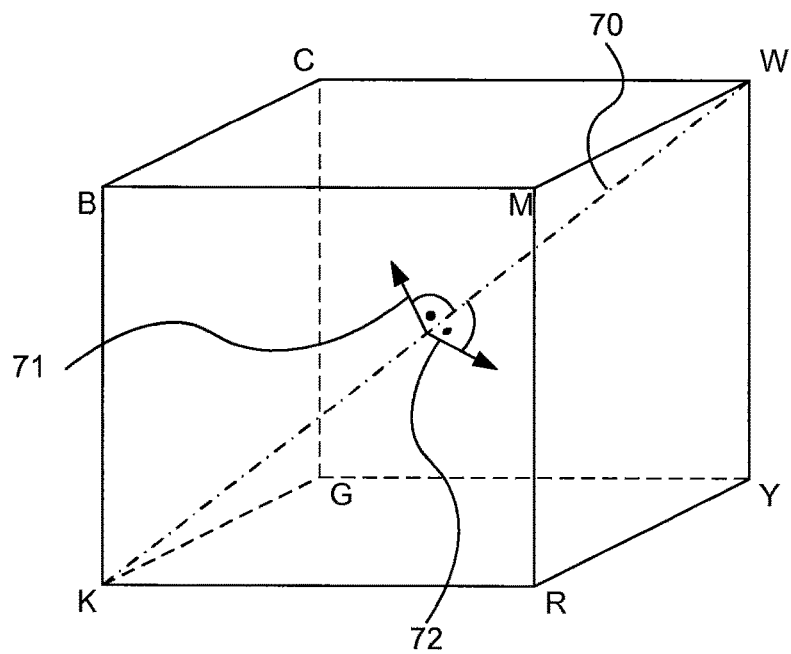
FIG. 6 shows a schematic representation of a RGB color space as a cube.

FIG. 6 shows a schematic representation of a RGB color space as a cube. The RGB color space with its component-wise limited value range can be represented as a cube. The corner points are designated by characters, wherein K is used for black, the origin of the color space, R for red, G for green, B for blue, Y for yellow, C for cyan, M for magenta and W for white. The connection line from K to W is called non-color line 70. The colors black, white and a plurality of shades of grey are arranged on it. Further directions which run perpendicular to the non-color line are designated as colored directions 71 and 72.

FIGS. 7a to 7d show schematic representations of different noise clouds in the RGB color space. To illustrate the effect of the color correction on the noise, a homogenous grey image of 64×64 pixels is assumed, which is recorded by an image sensor with a Bayer pattern. A normally distributed noise which is constant over the colors of the color filter is superimposed on the grey image. The debayring is performed by means of the often applied 2×2 method, in which missing values of missing colors R or B for a pixel are determined by searching respective neighboring pixels of the respective missing color to the left or to the upper side or to the left upper side and which value is directly taken and an average of both green pixels either arranged to the left and upper side or at the pixel itself and on the upper left side is always generated to determine the values for G. The color values 80 thus obtained are drawn in a RGB color space, wherein K is the black origin and R, G and B are base vectors of the RGB color space. FIGS. 7a and 7b show two different views of the same cloud of color values. In FIG. 7a, the viewer views from a red direction perpendicular to the non-color line, while the viewer in FIG. 7b views in parallel to the non-color line. The origin K is then hidden by the cloud of color values.

Now, a color correction as practically used is applied to the cloud of color values 80 shown in FIGS. 7a and 7b and thereby color-corrected color values 81 are obtained. They are shown in FIGS. 7c and 7d in the same manner as the color values 80 in FIGS. 7a and 7b, so that a direct comparison is possible. The extension of the cloud can be interpreted here as an intuitive measure for the strength of the noise. It is thus advantageous if a small cloud of color values is obtained, since this corresponds to a smaller noise, which leads to a better perceived image quality. A direct comparison shows that the cloud of the corrected color values 81 has a substantially higher extension in the colored directions as compared to the cloud of the original color values 80, which illustrates that the color noise is substantially increased by the color correction in a disadvantageous manner.

Mathematical image processing processes are known, by which the images of digital cameras can be softened. By the softening the noise is advantageously reduced, whereby however the image sharpness is reduced. Mathematical image processing processes to reduce the disadvantageous image noise are called "denoising".

Figure 8:
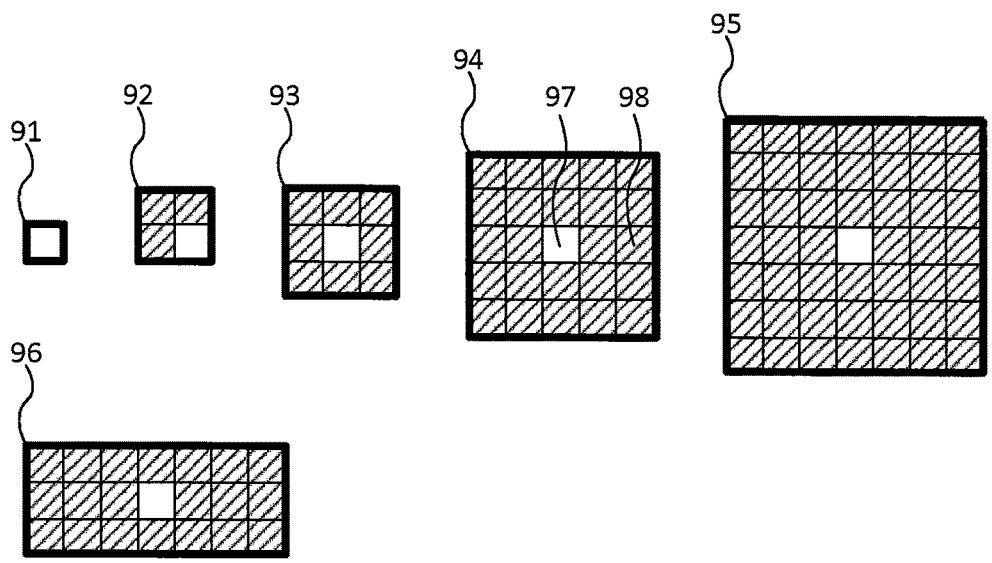
FIG. 8 shows schematic representations of different environments of a pixel.

FIG. 8 shows a schematic representation of different environments of a pixel. Numerous of the above mathematical image processing processes require values of surrounding pixels 98 to calculate values for a central pixel 97. Therefore, many of these mathematical image processing processes cannot be based on a 1×1 environment 91, but require a bigger environment, e.g. a 2×2 environment 92, a 3×3 environment 93, a 5×5 environment 94 or a 7×7 environment 95. Also, non-square environments are possible, e.g. a 7×3 environment 96.

Figure 9:
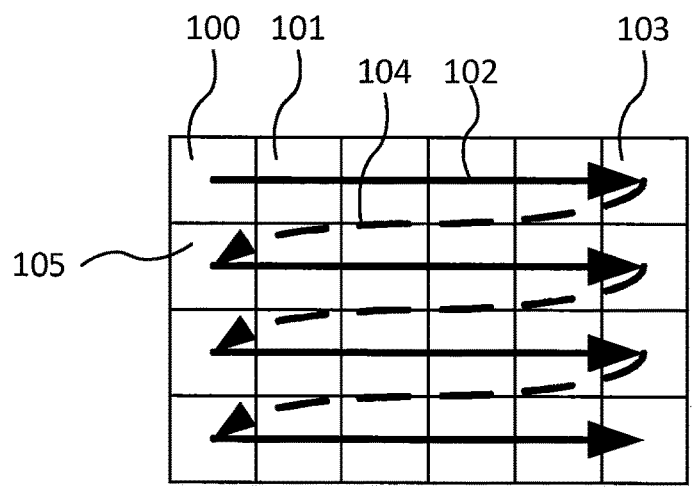
FIG. 9 shows a principle representation of a progressive read-out process.

FIG. 9 shows a principle representation of a progressive read-out process. Image sensors generally output images in a progressive manner, which is also designated as progressive read-out. In this case, the signal of a pixel 100 is initially output in a row direction 102 and then the signal of its neighboring pixel 101 on the right side and so on in reading direction. If the last pixel of a row 103 has been reached, the row-wise read-out generates a jump 104 to the next row 105 and starts there with the first pixel again.

As most of the above mathematical image processing processes require environments, the value of a pixel must be calculated with the help of an environment, wherein the concerned pixel is located in the center. To build up such an environment, a memory is necessary. In case of progressive read-out N−1 full rows must be stored in this memory. Additionally, a memory for N−1 pixels is further required. In conventional image sensors the row length is substantially larger than N−1, so that the size of the required memory is mainly determined by the number of rows.

Figure 10:
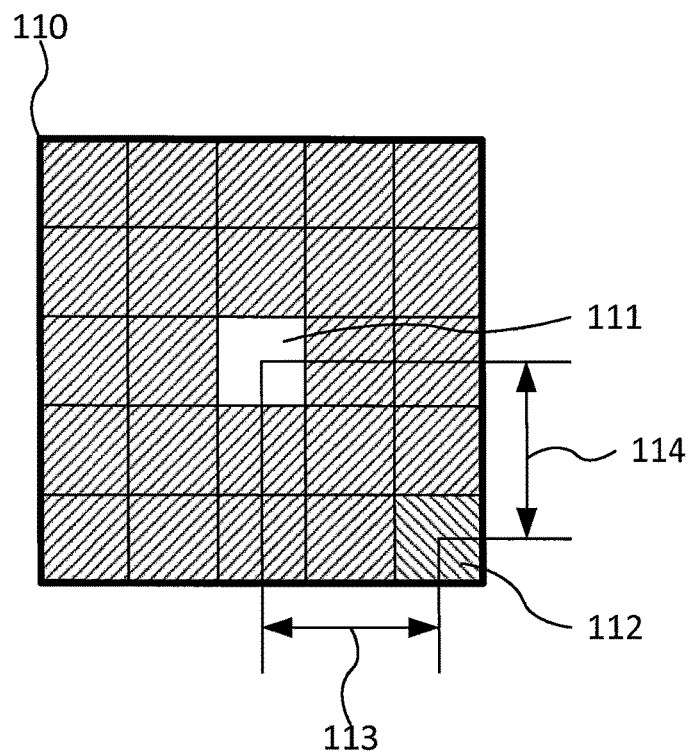
FIG. 10 shows a schematic representation for explaining a read-out latency.

FIG. 10 shows a schematic representation for explaining a read-out latency. If a signal of a pixel 112 is progressively transmitted and if a mathematical image processing process, which requires an environment, e.g. a 5×5 environment 110, shall be used for calculating a value for this pixel, this is not immediately possible, since the values in the same row on the right of the pixel 112 as well as all values in the rows below the pixel 112 have not been transferred to the corresponding processing unit yet and are thus not yet known to it. The pixel which is least far backward, that is, the pixel for which the transmission of the signal is least far back in time and for which after transmission of the signal of the pixel 112 signals of a full 5×5 environment 110 are present, is the central pixel 113. From the time at which the value of the pixel 112 is known, values of the central pixel 111, e.g. color values, can be calculated and then progressively transmitted via an interface. This means that the progressive transfer of the resulting image of values can be effected earliest after a horizontal latency 113 plus a vertical latency 114, wherein the time of this latency can be calculated from the data rate and the row length as well as the relative position of the neighboring pixel 112 with respect to the central pixel 111. Since it is advantageous if the output of the image from the camera is fast, as explained above, the horizontal latency 113 and the vertical latency 114 should each be as small as possible. Since the vertical latency 114 is mostly larger by orders than the horizontal latency 113 in case of progressive output of the image, the vertical latency 114 especially should be as small as possible.

The vertical latency produced by an N×N environment amounts to at least (N−1)/2 rows and the horizontal latency to (N−1)/2 pixels. In the above example a memory is additionally required for building up the environment 110, in which the signal of the pixel 112 is stored and from which the signals of all other pixels of the environment 110 can be retrieved for building up the environment 110. Since the image shall be output from the digital industrial camera at a high data rate, as explained above, the access to such a memory must also be possible at a high data rate.

Furthermore, a plurality of signals from the environment are required for the calculation of a value of a pixel when use is made of an environment, e.g., 25 values in case of a 5×5 environment. From these, only a signal of the pixel 112 has been newly transmitted, so that in the above example according to FIG. 10, 24 values most be retrieved from the memory. This means that the data rate for the access to the memory must be many times higher than the data rate at which the digital industrial camera outputs the image. If the digital industrial camera shall output the image at 100 million ($10^8$) pixels per second, for example, $10^8$ values are then to be calculated per second which requires $10^8$ write operations per second into the memory and $24 \times 10^8 = 2.4 \times 10^9$ reading operations per second from the memory. Memories which support such a high data rate for the access are naturally small, that is, they have a small memory capacity, and are expensive. As examples, the so-called embedded RAM (Random Access Memory) of an FPGA or the Level-1 Cash of a DSP may be mentioned here. It is thus advantageous if the applied mathematical image processing process requires as little memory capacity as possible and as little data access rate as possible. That is, the environment should be selected as small as possible.

Figure 11:
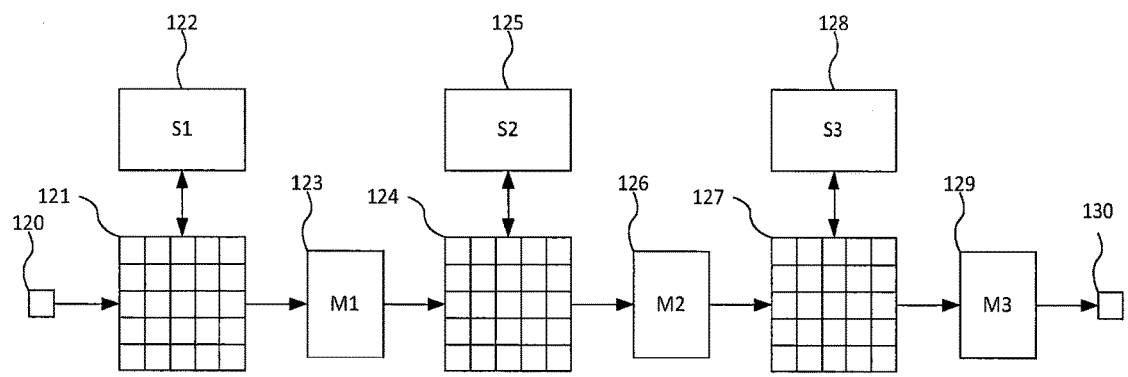
FIG. 11 shows a schematic flow diagram of sequential image processing processes related to the environment.

FIG. 11 shows a schematic flow diagram of successive environment-related image processing processes. There are image processing actions in which signals of a pixel 120 are successively subjected to different mathematical image processing processes 123, 126 and 129. A first process (M1) 123 requires an environment 121 which is generated from the data stream of the signals of the pixel 120 by means of a first memory (S1) 122. Since a later second process (M2) 126 uses the result of the first process 123 in a manner so that a second environment 124 of the pixels of the results of the first process 123 is required, this second environment 124 must be generated by means of a second memory (S2) 125. Similarly, a third environment 127 must be generated from the results of the second process 126 by means of a third memory (S3) 128, if a third process (M3) 129 requires these. In this manner, an arbitrary number of processes can be performed one after the other. In the end, a final value 130 is output as the result. If the memories 122, 125 and 128 are configured as separate devices, the complexity of the camera is increased. If the memories 122, 125 and 128 are integrated in a single component, the combined memory must have a higher bandwidth for the access than required in case of separate memories. Moreover, each further environment also leads to a disadvantageous increase in latency of commonly at least (N−1)/2 rows and (N−1)/2 columns.

In the following embodiments, a digital industrial camera comprising an image sensor with a Bayer pattern and comprising a processing unit or a Frame Grabber or a computer is provided, which is provided with a monolithic mathematical image processing process and which generates a high-quality color image from the signal of the image sensor, wherein particularly little memory capacity is required and memory access at particularly low bandwidth is offered. The image can be output at particularly little vertical and horizontal latency, wherein debayring is performed to generate a high-quality and low-noise color image. Thereby, color aliasing and green-green imbalance are prevented while noise is low (in particular color noise is low) and image sharpness is good. Herein, a monolithic mathematical image processing process is to be understood as a process in which all required image processing processes are performed on a single environment.

Figure 12:
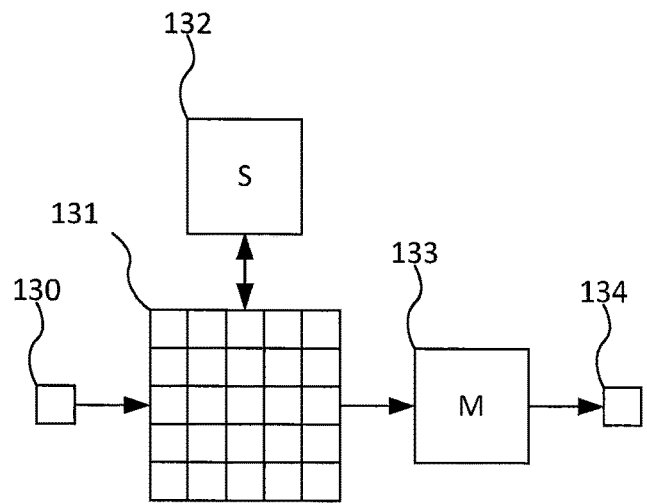
FIG. 12 shows a schematic flow diagram of a monolithic image processing process.

FIG. 12 shows a schematic flow diagram of a monolithic image processing process. Here, exactly one environment 131 is built from a data stream of signals of a considered pixel 130 using a memory (S132). On this environment 131 resultant values 134 are calculated by means of a monolithic mathematical process (M) 133 which performs at least one image processing selected from debayring, anti-aliasing, denoising, sharpening and correction of the green-green imbalance. Thereby, memory requirements can be kept low and a relatively small bandwidth is required for memory access, which leads to a low latency. The environment 131 may have a quadratic shape, that is, a size of N×N pixels. Thereby, it has a shape which is mirror symmetric in horizontal and vertical direction as well as rotational symmetric by 90° and allows usage of corresponding symmetric image processing processes. These in turn have the advantage that no horizontal or vertical predominant direction are visible, which may be perceived as annoying by a user.

Furthermore, the N×N environment 131 can be selected so that N is an odd number. This leads to the advantage that a central pixel 111 is provided, from the position of which the environment 131 covers the same number of pixels in horizontal, vertical or diagonal direction. This provides the advantage that calculation rules can be applied without disadvantageous phase shifts. Moreover, this has the advantage that visible predominant directions in the image obtained from the resultant values can be prevented.

Figure 13:
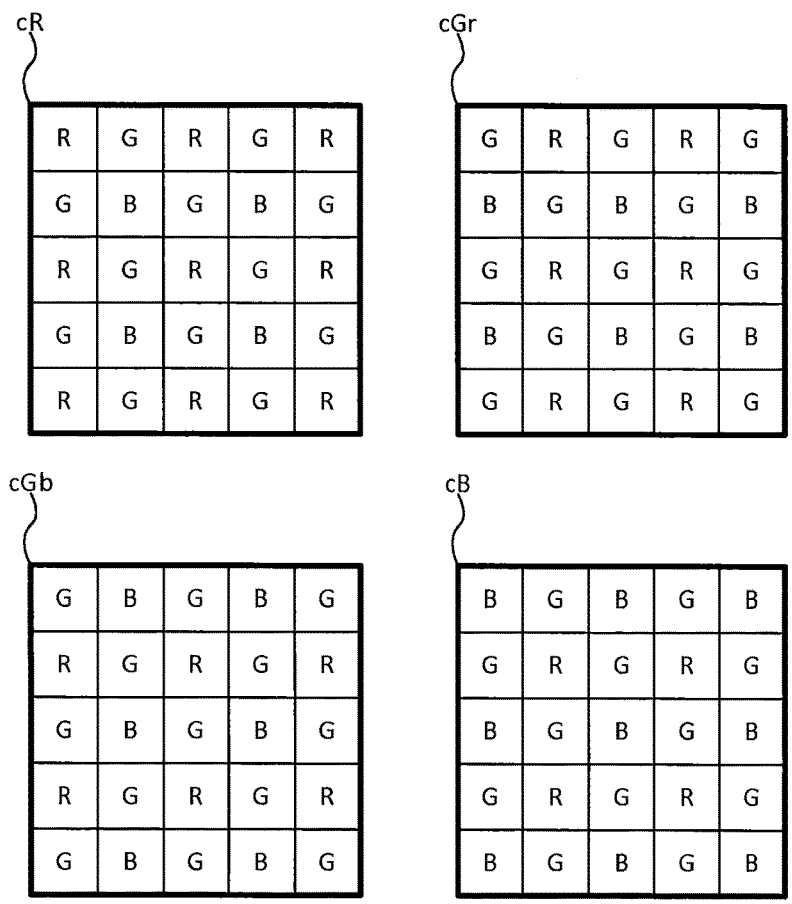
FIG. 13 shows a schematic representation of the four phase relationships of a Bayer pattern.

FIG. 13 shows a schematic representation of the four phase relationships of a Bayer pattern. There are exactly four phase relationships of the Bayer pattern with regard to an environment. The case in which the central pixel is red (R) is called "cR", the case in which the central pixel is green (G) and the horizontally neighboring pixel is red (R) is called "cGr", the case in which the central pixel is green (G) and the horizontally neighboring pixel is blue (B) is called "cGb" and the case in which the central pixel is blue (B) is called "cB".

It is advantageous if the N×N environment is selected so that N=5. If N=1, debayring is not possible, since a 1×1 environment does not contain all colors. If N=3, all colors are in fact included in the environment, whereas in the cases cR and cB there is however a color which occurs only once. For debayring with little color noise it is however advantageous if several pixels are contained in the environment for each color, since then these pixels can be offset with each other while noise is advantageously reduced. However, this is only possible if the size of the environment is N=5 or larger. This also applies for N=7, N=9, N=11 and so on. However, larger environments of N>5 require higher memory capacities and higher bandwidths for the access to the memory. In general, the following embodiments may however also be implemented with larger environments.

Figure 14:
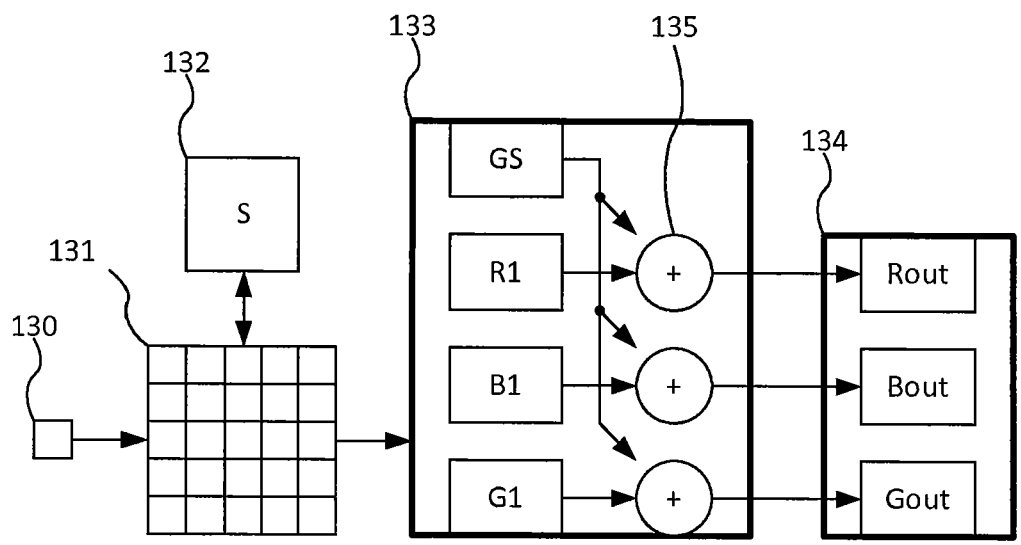
FIG. 14 shows a schematic flow diagram of a reconstruction of color components according to a first embodiment.

FIG. 14 shows a schematic flow diagram of a reconstruction of color components according to a first embodiment.

As explained above, the color value of a resultant value 134 consists of a color vector in the RGB color space, the components of which for red, green and blue are called "Rout", "Gout" and "Bout" here. It is suggested that these components are calculated through the monolithic mathematical image processing process 133 in such a manner that low-noise color components R1, G1 and B1 are first determined, to each of which a green structural information GS is added by respective adders 135. This design leads to a low color noise for the following reasons. First of all, the color components R1, G1 and B1 are of low noise per definition. The additional of an identical value of GS to all three color components leads to a shift of the color value parallel to the non-color line of the RGB color space. Thus, a noise addition through the value GS cannot lead to a disadvantageous color noise in the resultant value 134, but only to a non-color noise.

Figure 15:
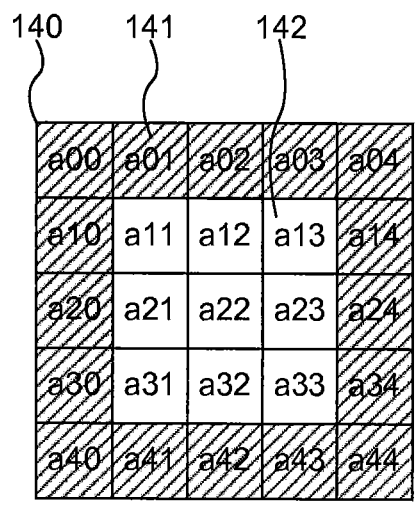
FIG. 15 shows an exemplary convolution matrix.

FIG. 15 shows an exemplary convolution matrix 140. The calculation of values from an environment can be achieved through application of the convolution matrix 140 depicted in FIG. 15 on the environment of a target pixel. Such a convolution requires little calculation effort if many elements of the convolution matrix 140 are equal to zero, since mathematical operations allocated to these elements of the convolution matrix can be dispensed with. The elements a00, a01, a02, a03, a04, a10, a14, a20, a24, a30, a34, a40, a41, a42, a43 and a44 are therein called edge elements 141 and the elements a11, a12, a13, a21, a22, a23, a31, a32 and a33 as inner elements 142.

It is advantageous if the three convolution matrices applied for determination of the values R1, G1 and B1 are structured in a manner that the colors red, green and blue are reproduced as correctly as possible. This requires that the sum of all elements of the convolution matrix, which are offset against values of red pixels, leads to the value "1" in the calculation of R1, and the sum of all elements which are offset against values of green pixels leads to the value "0" as well as the sum of all elements which are offset against values of blue pixels also leads to the value "0". In the same manner it is required that for calculation of G1, the sum of all elements of a convolution matrix, which are offset against values of green pixels, leads to the value "1" and the sum of all elements, which are offset against values or red pixels, leads to the value "0" as well as the sum of all elements which are offset against values of blue pixels, also leads in the value "0". And in the same manner it is required that for calculation of B1 the sum of all elements of the convolution matrix, which are offset against values of blue pixels, leads to the value "1" and the sum of all elements which are offset against values or red pixels, leads to the value "0" as well as the sum of all elements which are offset against values of green pixels also leads to the value "0". For the same reason it is also required that for calculation of GS the sums of the elements of the convolution matrix, each of which are allocated to the pixels of one of the colors red, green or blue leads to the value "0" each. Since the pixels of the colors red, green and blue are located at different positions depending on the phase relation cR, cGr, cGb or cB, it is appropriate to use an own convolution matrix for each of the four phase relationships and for each of the three colors, so that a total number of 12 convolution matrices is obtained for three colors and four phase relationships. Then, the values R1, G1 and B1 are selected from values obtained by application of the convolution matrices on the environment depending on the phase relationship. As an alternative, it is also possible to conduct only such convolutions the resultant values of which are actually required. The latter is advantageous if a DSP is used for example, since the calculation effort is thereby reduced.

Moreover, it is advantageous for reducing the calculation effort to make us of the phase symmetries of the Bayer pattern. In this case the red pixels are located in cR at a position in which the blue pixels are located at cB, so that for calculation of R1 at cR the same convolution matrix can be used as for calculation of B1 at cB. Thus, the symmetrical alpositions listed in the following table can be used, each of which allows joint usage of calculation results and thus reduction of the calculation effort for R1, G1 and B1 by one half, that is, from twelve to six convolution actions.

| First phase relationship | First calculation result | Second phase relationship | Second calculation result |
| --- | --- | --- | --- |
| cR | R1 | cB | B1 |
| cR | G1 | cB | G1 |
| cR | B1 | cB | R1 |
| cGr | R1 | cGb | B1 |
| cGr | G1 | cGb | G1 |
| cGr | B1 | cGb | R1 |

To comply with the above-mentioned advantageous symmetrical requirements, it is advantageous if the convolution matrix is respectively selected to be mirror symmetric in horizontal and vertical direction as well as rotational symmetric by 90°, as far as the position of the colors in the Bayer matrix allows this. According to EMVA 1288 it is assumed that the noise of signals of different pixels of the image sensors is not correlated among each other, that is it is a statistically independent random event. Thus, the effect of a convolution with the environment from signals of pixels can be estimated by means of an error propagation calculation. The noise propagation of a convolution matrix is especially low if and only if the elements of the convolution matrix are as small as possible and positive each. This is advantageous, since values of low noise can be produced by means of such a convolution matrix.

In an FPGA, values are represented by bit vectors, that is, by numbers in a binary system. Multiplications by constant multiples of 2 or ½ can be performed there at low effort, since the respective registers including these numbers have to be accessed in a different manner only, namely in a shifted manner. If the elements of the convolution matrices are constantly selected as multiples of 2 or ½, the respective allocated multiplication can be provided without use of hardware resources, e.g., fixedly wired multipliers, whereby hardware resources can be saved.

In case of the use of convolution matrices, in which the values of edge elements of a color are greater than or equal to the inner values of the same color, disadvantageous image artefacts are observed. If for example only elements of identical positive values as well as other elements of the value "0" are provide, image artefacts can be generated, which make the image disadvantageously look as a mosaic. Such artefacts can be prevented by selecting the values of the edge elements to be smaller in their absolute value than the values of the inner elements.

FIG. 16 shows exemplary convolution matrices for determination of the values R1, G1 and B1 in the phase relationships cR, cGr, cGb and cB, which meet the above-mentioned advantageous requirements. The fractional value in front of the actual convolution matrix in each case means that all values of the convolution matrix have to be multiplied by this value. Furthermore, the convention is introduced that all empty fields contain the value "0". Thereby, a more simple notation and better readability is obtained in the following.

For the phase relationship cR the convolution matrix FRcR is used for determination of R1, the convolution matrix FG1cR is used for determination of G1 and the convolution matrix FB1cR is used for determination of B1. For the phase relation cGr the convolution matrix FR1cGr is used for determination of R1, the convolution matrix FG1cGr is used for determination of G1 and the convolution matrix FB1cGr is used for determination of B1. For the phase relation cGb the convolution matrix FR1cGb is used for determination of R1, the convolution matrix FG1cGb is used for determination of G1 and the convolution matrix FB1cGb is used for determination of B1. For the phase relation cB the convolution matrix FR1cB is used for determination of R1, the convolution matrix FG1cB is used for determination of G1 and the convolution matrix FB1cB is used for determination of B1.

FIG. 17 shows exemplary convolution matrices for determination of the green structural information GS in the phase relationships cR, cGr, cGb and cB. In case of the phase relationships cR or cB, respectively, GS is determined by application of the convolution matrices FGScR or FGScB, respectively, and in case of the phase relationships cGr and cGb by application of the convolution matrices FGScGr and FGScGb. In this implementation the above-mentioned advantageous features are also met, except for the feature that all elements of the convolution matrix are positive. Meeting this feature is intentionally dispensed here, to be able to meet the requirement for determining the value for the green structural information GS. Namely, that the sum of all elements shall be zero.

Such convolution matrices according to FIG. 17 provide the deviation of the structure from the green value G1 as green structural information GS in such a manner that the addition of the structural information contributes structurally richer values in an advantageous manner.

FIGS. 18a to 18d show schematic representations for explaining the generation of wrong colors at small structures. If small structures are recorded by an image sensor with Bayer pattern and if color values are then calculated by a debayring, disadvantageous wrong colors often occur. Their cause can be explained by FIGS. 18a to 18d. It is assumed that according to FIG. 18a a horizontal black-white stripe pattern is recorded by the image sensor, which consists of horizontally directed bright stripes 160, 162 and 164 and of dark stripes 161 and 163 directed in parallel to these, wherein it applies for the bright and dark stripes 160 to 164, respectively, that the signals for red, green and blue are respectively identical among each other. Note that all red pixels are bright and all blue pixels are dark. This stripe pattern is now transferred as data stream and an environment is built up therefrom in an image processing calculation unit, based on which color values R1, G1 and B1 are calculated under application of the convolution matrices FR1cR, FG1cR and FB1cR shown in FIG. 16. Note that the convolution matrix FR1cR calculates the convolution sum from bright red signals of rows with the bright stripes 160, 162 and 164 only and, on the other hand, the convolution matrix FB1Cr calculates the convolution sum from dark blue signals of rows with the dark stripes 161 and 163 only. If the effect of the convolution matrix FG1cR is considered in a similar manner, an orange color value with color components R1, G1 and B1 results from this and also an orange color value with color components Rout, Gout and Bout. These orange color values correspond to undesired wrong colors, since the originally recorded image of stripes is totally non-colored.

A similar situation is obtained in FIG. 18b. Here, a horizontal black-white stripe image of dark stripes 165, 167 and 169 as well as of bright stripes 166 and 168 is assumed also. In this case, the blue pixels are bright and the red pixels are dark and under application of the convolution matrices FR1cR, FG1cR and FB1cR, a sky-blue color value is obtained now, which again corresponds to a disadvantageous wrong color.

FIG. 18c shows the same situation, this time however with a vertical black-white stripe image of bright stripes 170, 172 and 174 and dark stripes 171 and 173. Similarly, as in the case of FIG. 18a, a non-desired orange wrong color is obtained for the resultant color value.

Finally, the same situation as in FIG. 18c is shown in FIG. 18d, the bright stripes 176 and 178 are however not located above the red pixels here, but above the blue pixels, and the dark stripes 175, 177 and 179 are not located above the blue pixels, but above the red pixels. Accordingly, a non-desired sky-blue wrong color is obtained here.

Figure 19:
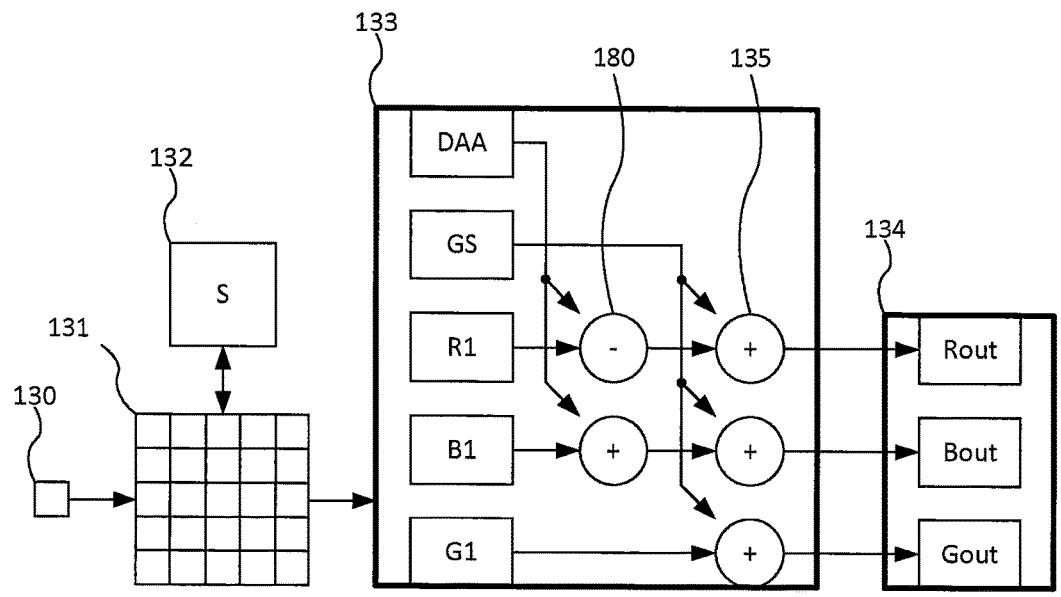
FIG. 19 shows a schematic flow diagram of a reconstruction of color components with additional correction of wrong colors according to a second embodiment.

FIG. 19 shows a schematic flow diagram of a reconstruction of color components with additional correction of wrong colors according to a second embodiment, in which the mathematical image processing process 133 is developed in such a manner that an additional correction value DAA is calculated from the environment 131 to remove the wrong color, which is respectively added to or subjected from the component values R1 and B1 by means of an adder/subtractor 180 with a sign that depends on the phase relationship, that is, added to one value and subtracted from the other value. An example of a calculation of the additional correction value DAA is shown in FIG. 20.

This approach is based on the awareness that the stripes in an alternating bright and dark pattern can be found again on the green pixels. As the geometrical situation for different colors and for different directions of the stripes comprises symmetries in color and space, it can be followed that exactly the same correction value DAA which is added for one of the color components R1 and B1 as correction value must be subtracted from the other one of the respective color component.

Figure 20:
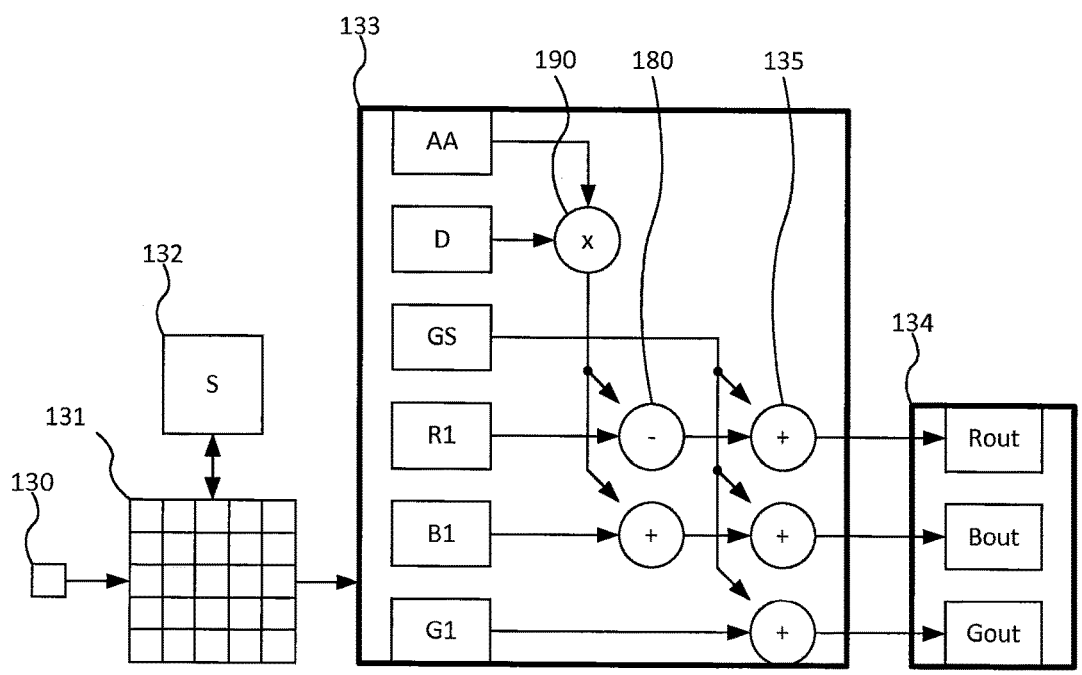
FIG. 20 shows a schematic flow diagram of a reconstruction of color components taking into consideration the direction of small structures for the color correction according to a third embodiment.

FIG. 20 shows a schematic flow diagram of a reconstruction of color components taking into consideration the direction of small structures for the color correction according to a third embodiment.

A comparison of the exemplary cases in FIG. 18a and FIG. 18c and, on the other hand, the exemplary cases in FIG. 18b and FIG. 18d leads to the result that in a respective first case exactly those green pixels are bright, which are dark in the respective second case. It is thus possible to determine a value AA by a convolution of the signals of the green values from the environment 131, respectively, and to multiply this value with a positive or negative direction estimation value D by a multiplier 190, wherein the sign of the direction estimation value D depends on a horizontal or vertical predominant direction in the image, to thereby determine the correction value DAA in a suitable manner. The third embodiment can thus be realized in a simple manner with little hardware effort or with low calculation time, to thereby be able to reduce or remove wrong colors.

As an alternative, it is also possible to use the direction estimation value D in another way, e.g., to calculate a weight of a weighted average from it and to apply this weighted average between two values allocated to the different directions.

Also, it is alternatively possible to select among values of different directions on the basis of the direction estimation. Thereby, the need for logic resources in the FPGA can be reduced.

Furthermore, it is advantageous to design the respective convolution matrix for the determination of the value AA in such a manner that the signs in the convolution matrix change with each row and column, since then an effective correction term is achieved for an illumination intensity which changes in each row or column. Also, it is advantageous, if the sum of the elements of the convolution matrix for determination of AA results in the value "0". Thereby, wrong colors can also be prevented in structureless areas.

Figure 21:
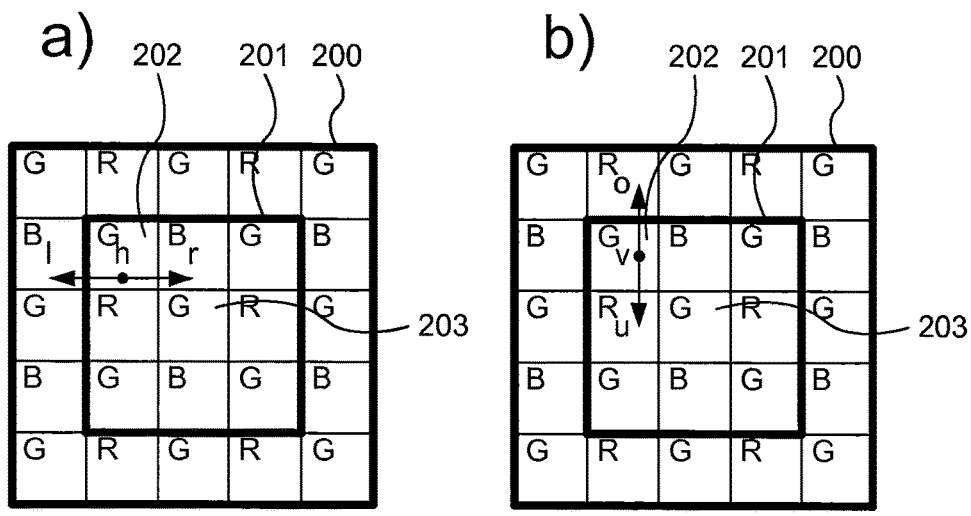
FIG. 21 shows exemplary convolution matrices for determining a value for AA.

FIG. 21 shows exemplary convolution matrices for determination of the value AA. Here, the convolution matrix FAAcG is used for the phase relationships cGr and cGb and the convolution matrix FAAcRB for the phase relationships cR and cB. These convolution matrices meet the above requirements and provide the additional advantage that the absolute values of all elements contain powers of two, so that a simple and resource-saving multiplication can be realized for the image processing (e.g. in the FPGA) by simply shifting binary numbers.

As already mentioned, the direction estimation value D can be determined in a manner so that it comprises a different sign in case of a horizontally directed structure than in case of a vertically directed structure, and that its value is close to 0 in case of a structure without predominant direction, e.g. a smooth plane. Furthermore, it is advantageous if the calculation rules, e.g. the convolution matrices, are identical in the row sums for the phase relationships of horizontal neighboring pixels and identical in the column sums for the phase relationships of vertically neighboring pixels. Thereby, a continuous change of the direction estimations can be prevented, which could otherwise lead to undesired maze artefacts.

The effect of such maze artefacts can be checked by a predetermined test image, for example. To achieve this, the image kodim19.png (downloadable at http://optipng.soucreforge.net/pngtech/corpus/kodak/kodim19.html) can be used. This image is often used by experts to test mathematical image processing processes. In this case, an artificial sensor image signal is generated from the original color image by pixel-wise selection of a color component predefined by the Bayer pattern, and debayring is applied to it.

Then, the directional estimation value D can be determined by a comparison of two values DH and DV, one (DH) of which represents changes of brightness in the horizontal direction and the other (DV) represents changes of brightness in vertical direction, wherein a positive or negative sign is allocated to the direction estimation value D depending on which of the two values is higher. If both values are equal, the direction estimation value is set to "0". Thereby, the direction estimation value D can be determined in a simple manner.

It is possible a well to determine the direction estimation value D from an obtained difference of both values DH and DV. If the obtained difference exceeds a predetermined upper threshold value or a predetermined lower threshold value, the direction estimation value D can be set to the upper threshold value or to the lower threshold value, so that a cap is applied. It can be provided that the upper threshold value is set to the value "1" and the lower threshold value is set to the value "−1" and the value range of the direction estimation value D is thereby limited to the range from −1 to 1. This provides the advantage that in case of a clearly determinable direction of the structure with high differential value the direction estimation value D assumes the values "1" or "−1", and thereby the value DAA can be formed easily. Moreover, this has the advantage that in case of a direction of the structure, which is not clearly determinable, the direction estimation value D assumes a value which is smaller than 1 in its absolute value, whereby a smaller absolute value results for DAA and thereby excessive corrections on smooth planes in the image can be prevented.

FIGS. 22a to 22d show exemplary representations for explaining the determination of the horizontal (FIG. 22a) and vertical (FIG. 22b) change in brightness and inner areas which result therefrom for values of the horizontal (FIG. 22c) and vertical (FIG. 22d) change in brightness.

The change in brightness in horizontal or vertical manner, respectively, can be determined by determining for an inner area 201 of the environment 131 for each pixel a value as absolute value of the difference of the two neighboring pixels in horizontal and vertical direction, respectively. Then, as shown in FIG. 23a, a value h for the change in brightness in horizontal direction can be determined for a pixel 202 as absolute value of the difference of the values of the horizontally neighboring pixels l and r. Similarly, as shown in FIG. 23b, a value v for the change in brightness in vertical direction can be determined for a pixel 202 as absolute value of the difference of the values of the vertically neighboring pixels o and u. Depending on the phase relationship and depending on the color of the central pixel 203, the values h and v allocated to the pixel 202 represent a certain color. In case of the phase relationship cGr (for example as in FIG. 23a and FIG. 23b) the central pixel 203 is green, the pixels with the values l and r are each blue, and the pixels with the values o and u are each red. Thus, the value h represents a differential value of blue pixels and the value v a differential value of red pixels for the pixel 202.

Figure 22:
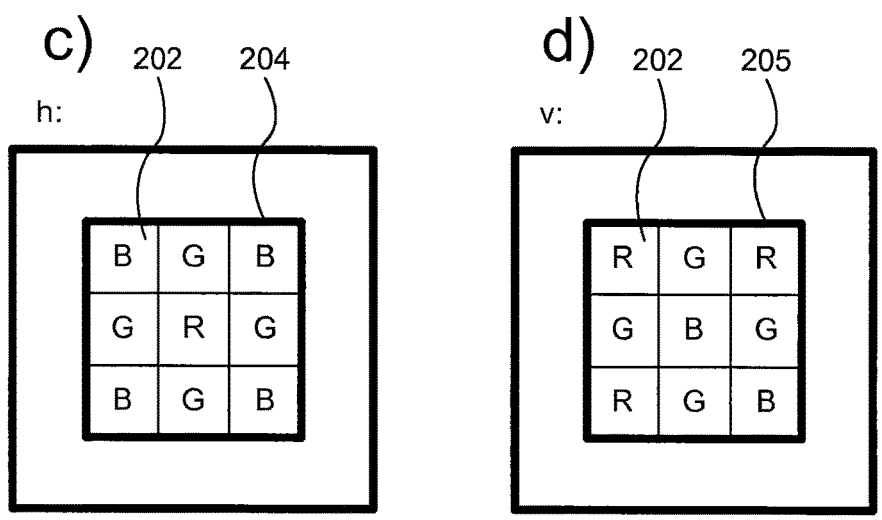
FIGS. 22a to 22d show exemplary representations to explain the determination of the a) horizontal and b) vertical changes in brightness and inner areas resulting therefrom for values of the c) horizontal and d) vertical changes in brightness.

FIG. 22c shows a color-based affiliation of the values for the horizontal change in brightness h. As shown before, the value h has the color blue B for the pixel 202. FIG. 22d shows the color-based affiliation of the values for the vertical change in brightness v. As shown before, the value v has the color red (R) for the pixel 202.

FIG. 23 shows an exemplary convolution matrix 210 for the direction estimation. To prevent a color dependency of the result, it is advantageous if differences of the different colors are each entered at the portions which correspond to their frequency of occurrence in the Bayer pattern, when the values DH and DV are determined from the values h and v. This can be achieved in a simple manner by using simple multiplications with powers of two by a convolution of the values h and v, respectively, of the inner area by means of the convolution matrix 210. If for example the convolution matrix 210 is applied to the areas 204 and 205 of FIG. 22a to FIG. 22d, the differential absolute values of the colors red and blue are entered into the calculation with the factor ¼ as well as those of the color green with the factor ½.

Furthermore, the convolution matrix 210 has a characteristic by which a non-desired change of the direction estimation and maze artefacts related thereto can be prevented. The cause of such often-observed alternative different direction estimations resides in that different colors for horizontal neighboring phase relationships are introduced in a row-wise manner into the convolution and, respectively, for vertical neighboring phase relationships column-wise with different factors. To prevent maze artefacts, it should apply for horizontal neighboring phase relationships (e.g., cR and cGr or cGb and cB) that for each row and for each color the row sum of convolution matrix elements belonging to this color should be equal. Furthermore, it should apply for vertical neighboring phase relationships (e.g. cR and cGb or cGr and cB) that for each column and for each color the column sum of convolution matrix elements belonging to this color should be equal.

In the convolution matrix 210 in FIG. 23 the respective row sum of the sum of the factors for the different colors of horizontally neighboring phase relationships is equal, and therefore maze artefacts are prevented.

Furthermore, it is advantageous if the convolution matrices shown in FIGS. 16, 17 and 21 can be derived from a common basic filter. Then, all filters are coordinated in space and disturbing color fringes can be prevented in an advantageous way. Furthermore, for each color and for each phase convolution matrices can be used for horizontal (IHF) or vertical (IVF) interpolation, respectively. As an example the value red at the position of the red pixel can be determined through a convolution with a matrix which comprises the value "1" in the center only and otherwise the value "0" only. Furthermore, the value red at the position of a green pixel, which is the horizontal neighbor of a red pixel, can be calculated as the average of the red pixels surrounding it. Then, the convolution matrix IHF would contain the value "½" on the left and on the right of the central pixel and otherwise the value "0". Similarly, more complex interpolation convolution matrices IHF and IVF can be provided, which consider flexions in the value range of another color, for example.

Finally, a modified convolution operation can be assumed, in which the size of the calculation environment is kept in the convolution and in which a color-based correct result is achieved in case of edge problems by suitable assumptions, e.g., by a periodical extension assumed for calculation while keeping the Bayer pattern. If for the different colors the interpolation convolution matrices for interpolation are offset in a suitable manner against position matrices for the different colors in the different phases and if the results are separated in a way as shown in FIG. 20, the above-mentioned matrices are obtained if very small contributions or differences are neglected.

FIG. 24 shows an example of a common basic filter. The depicted basic filter offers strongly noise-minimizing characteristics on one hand and leads on the other hand to convolution matrices which can be realized in the image processing calculation unit (e.g. FPGA) with little effort. In this way, all calculation rules for R1, G1, B1, GS and AA mentioned in the present embodiments can be calculated by this basic filter, for example.

FIG. 25 shows a schematic representation for explaining an estimation problem. If a direction estimation is available, the estimation problem explained in FIGS. 18a to 18d is posed in connection with the above-mentioned interpolation of the color green, for example. Here, a green value shall be estimated for the central pixel 154. It is assumed that the horizontally neighboring green pixels 150 and 151 are bright and both vertically neighboring green pixels 152 and 153 are dark. The question, whether the green value for the central pixel 154 is assumed to be bright or dark, can only be decided on the basis of further information. According to the invention, this information can be derived from the direction estimation value D, as explained in the following on the basis of a fourth embodiment.

Figures 26, 27:
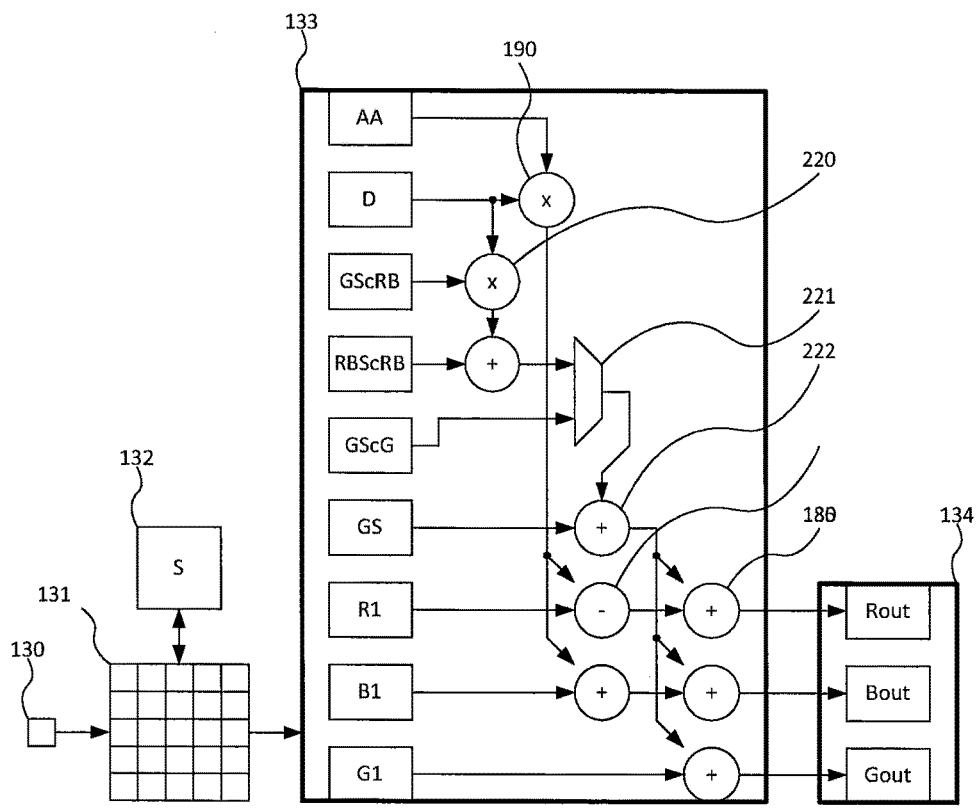
FIG. 26 shows a schematic flow diagram of a reconstruction of color components under consideration of the direction of small structures according to a fourth embodiment.
FIG. 27 shows exemplary convolution matrices FGScG, FGScRB and FRBScRB for the calculation of GScG, GScRB and RBScRB.

FIG. 26 shows a schematic flow diagram of a reconstruction of color components taking into consideration the direction of small structures according to the fourth embodiment.

In the present fourth embodiment a second detailed structural information, which is called GS2 here, is generated in addition to the structural information GS. For its calculation a case discrimination by means of a selection unit 221 between the phase relationships cGr and cGb summarized as phase relationship cG, on the one hand, and the phase relationships cR and cB summarized as phase relationship cRB, on the other hand, is required. In case of the phase relationship cG GScG is selected as second structural information. On the other hand, in case of the phase relationship cRB the sum of RBScRB and the product of GScRB and the direction estimation value D generated by the multiplier 220 is selected as second structural information.

This is based on the following thought: In the phase relationship cG the pixel in the center of the environment 131 is a green pixel already, the signal of which is available and which can be directly applied for generating the second structural information GScG. In the phase relationship cRB, however, the estimation problem shown in FIG. 26, is obtained in the green channel. According to the invention, this can be solved by determining the structural information of the green channel by means of a convolution matrix as GScRB in such a manner that the directional dependency is coded by the sign. If GScRB is now multiplied with a further multiplier 220 by the direction estimation value D, in which the direction information is also coded as a sign, a structural information is obtained, which solves the above-mentioned estimation problem in a correct way. The second structural information can be further improved in its degree of detailing by adding a value RBScRB by an adder 223, which itself contains the detailed structural information of the red or blue pixel, depending on whether the phase relationship cRB corresponds to the phase relationship cR or cB.

The addition of the second structural information provides the advantage that the image sharpness is improved thereby and that a more simple image processing can also be achieved, e.g., detection of writing. It is advantageous, if the corresponding convolution matrices FGScG, FGScRB and FRBScRB for GScG, GScRB and RBScRB each comprise the value "0" in their sum, since then disadvantageous brightness errors can be prevented. Furthermore, it is advantageous if the convolution matrices FGScG and FRBScRB are each rotational symmetric by 90° and thereby also mirror symmetric, since disadvantageous predominant directions visible in the resultant image can then be prevented. Furthermore, it is advantageous if the convolution matrix FGScRB is horizontally and vertically mirror symmetric and changes the sign upon a rotation of 90°. Thereby, the desired functionality in relation to the multiplication by the direction estimation value D can be achieved.

FIG. 27 shows exemplary convolution matrices FGScG, FGScRB and FRBScRB for calculation of the values for GScG, GScRB and RBScRB, wherein all advantageous characteristics mentioned above are met. Furthermore, the convolution matrices can be calculated by using a second basic filter GF2, as described above. Both convolution matrices are advantageously occupied little and only by powers of two or negative powers of 2, whereby the calculation effort in the image processing calculation unit (e.g. FPGA) can be kept low.

Figures 28, 29:
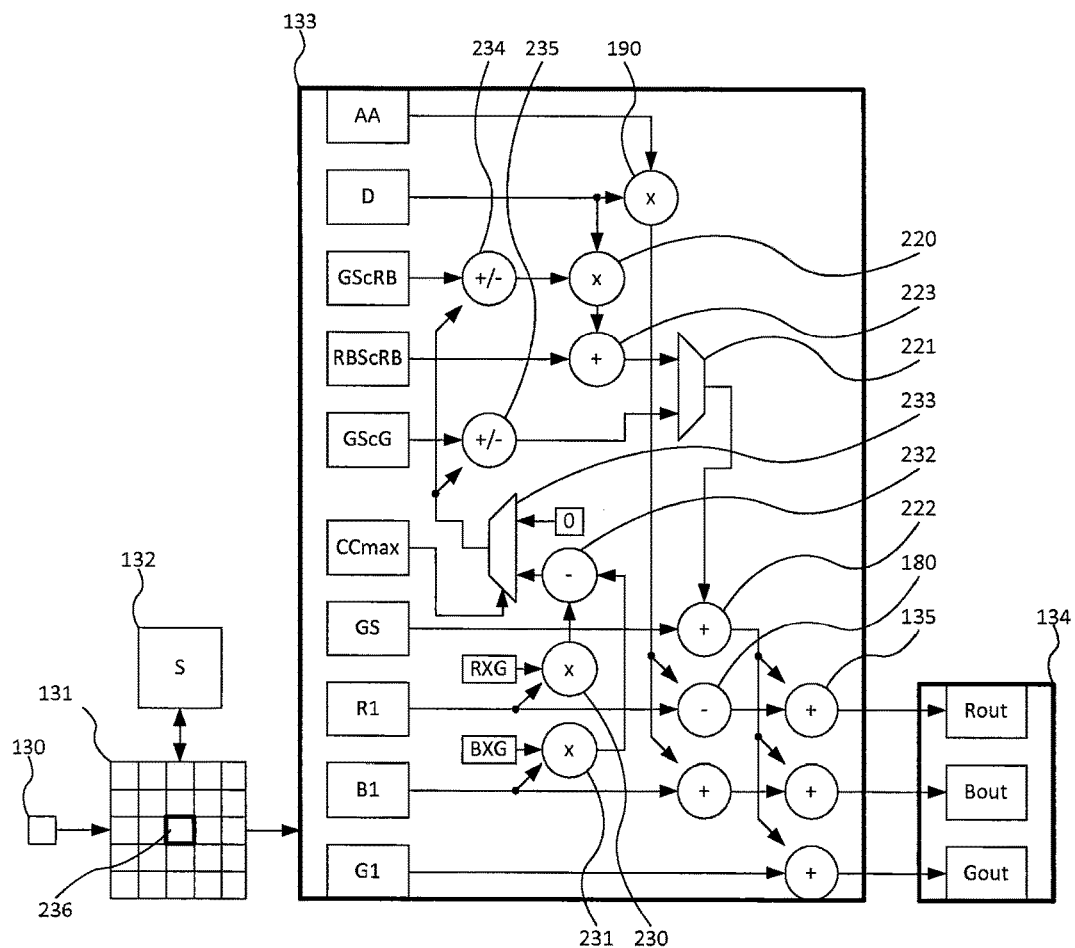
FIG. 28 shows an example of a second basic filter.
FIG. 29 shows a schematic flow diagram of a reconstruction of color components under consideration of the direction of small structures according to a fifth embodiment.

FIG. 28 shows an example of the second basic filter GF2. This filter advantageously comprises higher space frequencies and same symmetrical characteristics as the basic filter GF.

FIG. 29 shows a schematic flow diagram of a reconstruction of color components taking into consideration the direction of small structures according to a fifth embodiment.

In the fourth embodiment described above undesired checkered image artefacts can occur. These can be allocated to a green-green imbalance. By using different image sensors, different illuminations and different object colors, it can be proven that the green-green imbalance at a position of the image is proportional to the red signal available there and proportional to the blue signal available there, respectively. Thus, the green-green imbalance can be linearly corrected by using the color components R1 and B1. By measurements with different colors, values RXG and BXG, respectively, can be determined for various image sensors, which indicate how strongly the value of the green-green imbalance dG changes proportional to the color value of red and blue, respectively. The value dG is thereby defined as the difference Gr minus Gb.

Furthermore, it is to be considered that the values R1, G1, B1, GS, RBSeRB and the direction estimation value D are not influenced by the green-green imbalance. By contrast, the values GScG and GScRB are strongly influenced by the green-green imbalance. Theoretically, also the value AA is influenced by such a green-green imbalance, wherein this however does not show any visible effect in practice and a correction of the value AA with respect to the green-green imbalance can therefore be dispensed with.

The correction of the values GScG and GScRB with respect to the green-green imbalance requires the following modifications in the fifth embodiment. The color values R1 and B1, respectively, are multiplied with the values RXG and BXG, respectively, in corresponding multipliers 230, 231. From the results obtained thereby the difference is obtained by a subtractor 232 and the obtained difference is either added to the values GScG and GScRB or subtracted therefrom in a corresponding logical element 234, 235 depending on the phase relationship. The green-green imbalance is mainly caused by the red and blue pixel neighboring the green pixel. However, for the calculation of the values of R1, G1 and B1 red or blue pixels at a further distance can however also be used, so that undesired zipper artefacts can occur at image edges. Such disadvantageous image artefacts can be prevented on demand, by replacing the values R1 and B1 for calculation of a correction value for the green-green imbalance by other values R2 and B2, wherein the value R2 is determined taking into consideration the respective phase relationship of the signals of the red pixels closest to the center pixel 236 in the environment 131 and the value B2 correspondingly taking into consideration the respective phase relationship of the signals of the blue pixels most closely located to the center pixel 236.

FIG. 30 shows exemplary convolution matrices for determination of the values R2 and B2 from the values of the respective color most closely located to the center pixel 236. In the phase relationship cR the value R2 is determined by the convolution matrix FR2cR and the value B2 by the convolution matrix FB2cR. Furthermore, in the phase relationship cGr the value R2 is determined by the convolution matrix FR2cGr and the value B2 by the convolution matrix FB2cGr. In the phase relationship cGb the value R2 is determined by the convolution matrix FR2cGb and the value B2 by the convolution matrix FB2cGb. Finally, in the phase relationship cB the value R2 is determined by the convolution matrix FR2cB and the value B2 by the convolution matrix FB2cB. This kind of calculation is simple and saves resources, in particular due to the similarity of the convolution matrices FR2cR and FB2cB, the convolution matrices FR2cGr and FB2cGB, the convolution matrices FR2cGb and FB2cGr as well as the convolution matrices R2cB and B2cR, as shown in FIG. 30 and caused by the symmetrical characteristics of the Bayer pattern.

In the preceding and following embodiments, the multiplication by the values RXG and BXG is performed in connection with the values R1 and B1. However, it can also be applied in connection with the values R2 and B2.

The correction of the values GScG and GScRB with respect to the green-green imbalance can lead to a further disadvantageous image artefact, if a signal of the spatially central pixel 236 of the environment 131 assumes the maximum possible value (for example the value 255 for binary 8-bit-numbers), that is, it is saturated. If for example only saturated values are present in the environment 131, the values for GScG and GScRB are generally 0, since no varying image structure is present within the environment 131. It can then occur that a subtraction of a positive value obtained from the subtractor 232 is performed in the logic elements 234 or 235 in at least one phase relationship, so that a negative structural information is selected in the selection unit 221 as a result, whereby a disadvantageous ghost structure in the form of a regular point mash is visible in the resultant image, which constitutes an undesirable artefact.

This problem can be solved by determining a logical value CCmax which indicates whether the signal of the central pixel 236 is saturated. Based on this logical value CCmax a selection is performed in a further selection unit 233 as to whether the logical elements 234 and 235 are supplied with a value "0" (central pixel 236 saturated) or the result of the subtractor 232 (central pixel 236 not saturated). Of course, instead of the selection unit 233, an addition or subtraction which depends on the value CCmax can be provided in the logical elements 234 and 235, respectively. Thereby, the above-mentioned problem can be solved with little effort and the disadvantageous image artefacts can be prevented.

Figure 31:
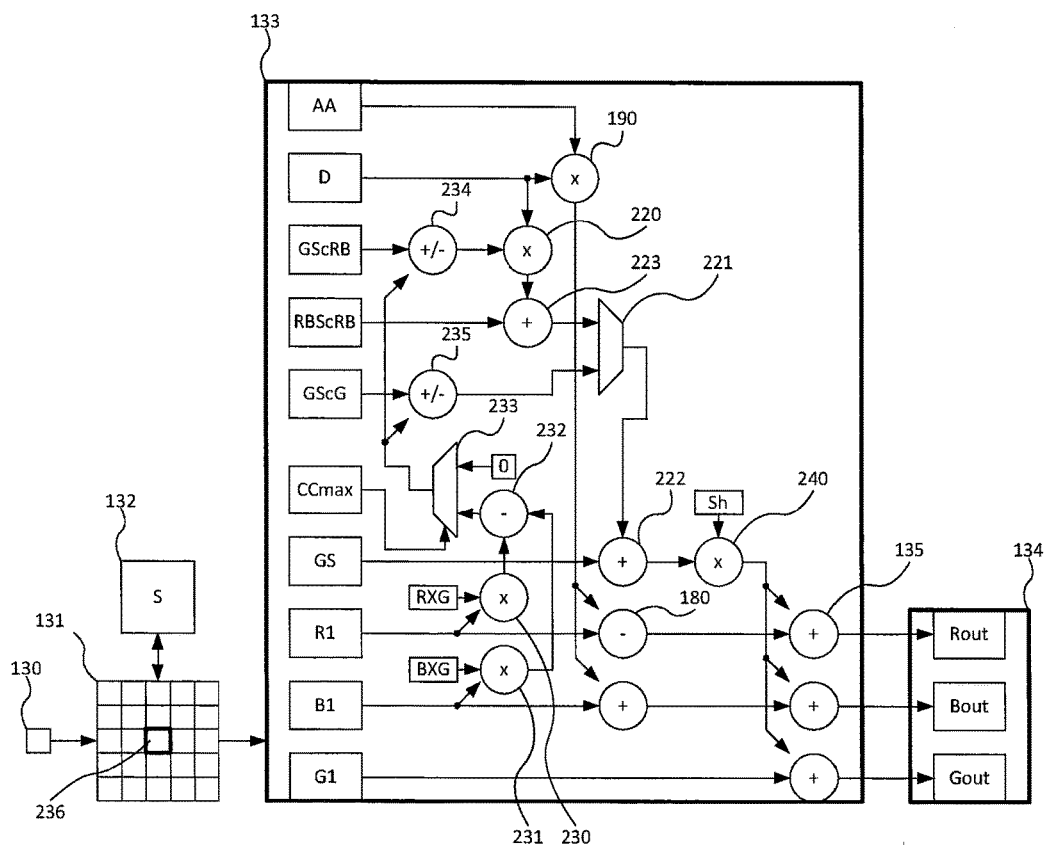
FIG. 31 shows a schematic flow diagram of a reconstruction of color components with improved image sharpness according to a sixth embodiment.

FIG. 31 shows a schematic flow diagram of a reconstruction of color components with improved image sharpness according to a sixth embodiment.

Often, a further improvement of the image sharpness is desired. This is achieved in the present sixth embodiment by multiplication of the summed structural information at the output of the adder 222 with a value Sh in a multiplier 240. If the value of Sh is larger than 1, this leads to the fact that an amplified structural information is added to the color values R1, G1 and B1 in the adder 135. The amplified structural information provides an advantageous sharper look of the image and emphasizes details. If an image shall be recorded, which has only few sharp details, the portion of the structure in the image can be reduced by a value of $0 \leq Sh < 1$ for Sh. In case of strongly noisy images this can lead to an advantageously perceived reduction of the non-color noise. Non-color noise is noise which is generated in a direction in the color space, which is parallel to the non-color line. If Sh is set to 1, no change of the image related to Sh is obtained.

Of course, the structural information can be multiplied by the value Sh prior to the addition in the adder 222. In this case, multiple multiplications are required however.

Also, a control element for setting the value Sh can be provided. It is generally possible to provide the control element at the camera directly. It is also possible to provide a register for setting the value Sh, by which a program or a user can set the value Sh via an electronic interface. It is further possible to provide a computer program by which a user can enter or set the value of Sh, e.g., by means of an input field or a sliding or rotational controller implemented by software. By the control element, the user, be it a human being or a computer program, can take influence on the image sharpness and a desired operation point for the image.

Figure 32:
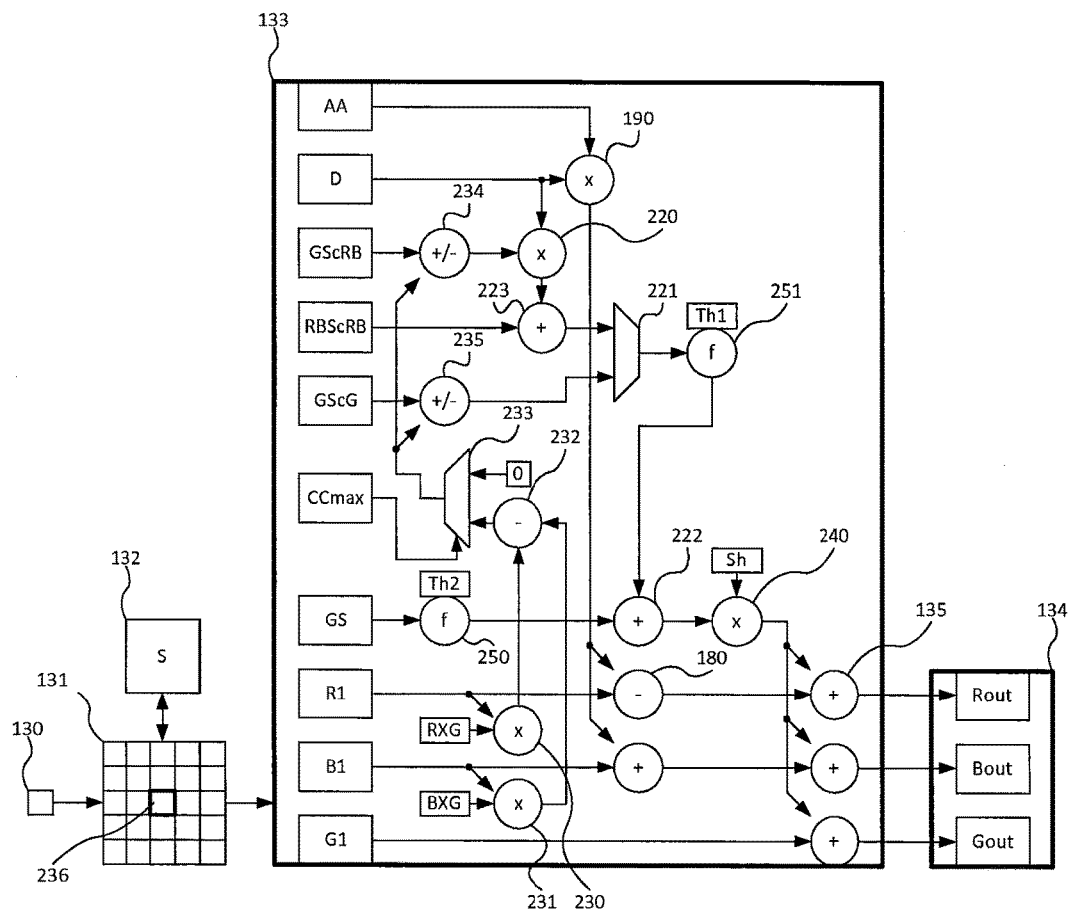
FIG. 32 shows a schematic flow diagram of a reconstruction of color components with denoising according to a seventh embodiment.

FIG. 32 shows a schematic flow diagram of a reconstruction of color components with denoising according to a seventh embodiment.

As already mentioned, especially non-color noise can occur in the color image according to the previous embodiments, which noise is called grey noise here, since the color noise has already been reduced substantially in the above-mentioned embodiments. The grey noise is reduced in the seventh embodiment by subjecting the structural information GS to a first non-linear function (f) 250 with a first setting value Th2 and the second structural information at the output of the selection unit 221 to a second non-linear function (f) 251 with a second setting value Th1. The results at the output of both non-linear functions 250, 251 are supplied to the adder 222, so that a low-noise structural information is obtained. Thereby, especially the noise in smooth planes, which is perceived as particularly annoying, can be reduced.

Figure 33:
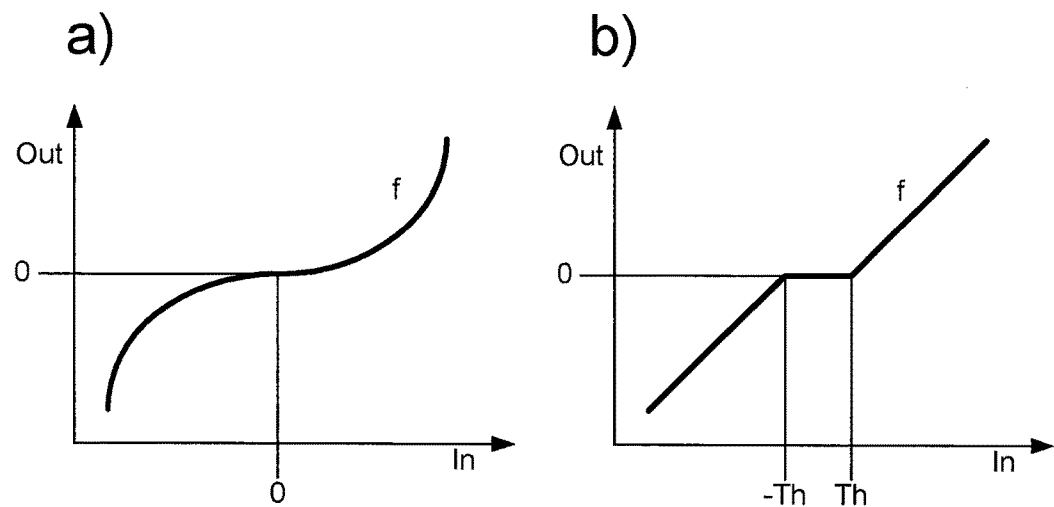
FIGS. 33a and 33b show diagrams of non-linear functions for reduction of the noise in the structural information.

FIGS. 33a and 33b show diagrams with exemplary non-linear functions for reduction of the noise in the structural information. The non-linear function f can be a continuous function which runs through the origin (0;0) of the coordinates, is continuously constant or monotonously increasing, wherein the rise in the origin is smaller than at at least one position remote from the origin. FIG. 33a shows such an exemplary function. A scaling with a parameter Th can be applied here for example in that the function is applied to the product of the input value and the parameter Th.

Such non-linear functions can be realized in an FPGA at especially low need of resources, if they are piece-wise linear. The above-mentioned non-linear function can therefore be approximated as piece-wise linear function according to FIG. 34b. This function is linear below a value −Th (e.g. with a slope 1), constantly 0 between the values −Th and Th, and again linear (e.g. with a slope 1) above the value Th.

The application of such a non-linear function is based on the finding that structural values of the noisy image comprise a certain noise amplitude. It is therefore advantageous to subject values within the noise amplitude (that is, between the values −Th and Th) to a function that reduces the noise. According to the doctrine of error propagation according to Carl-Friedrich Gauss, noise which can be interpreted as a measurement error of a pixel is then reduced if the first derivation of a function applied to the noisy value is small in its absolute value. It is therefore advantageous if the absolute value of the slope of the function f close to the origin, that is, within the noise amplitude, is small. Specifically, it is advantageous if the absolute value of the slope of the function f close to the origin and within the noise amplitude is zero and the absolute value of the function f itself is also zero there, because the non-linear function f then reduces the noise within the noise amplitude. In this case, such image structures having an absolute value below the noise amplitude are also removed from the image. As such structures are hardly visible anyway, this does not lead to any noteworthy detraction of image quality.

Analogous to the control element for Sh, control elements can be provided for setting the values of Th1 and Th2. Furthermore, the theoretical relation of the different noise amplitudes can be determined by applying the doctrine of error propagation to the calculation of the first and second structural information. To simplify the operation, it is advantageous to couple the setting of the values Th1 and Th2 with each other by fixed factors calculated therefrom and to provide only one control element for a value Th which is in turn coupled to the values Th1 and Th2 via fixed factors. Thus, one control element can be provided for setting the value Th. This control element can be provided at the camera directly. It is also possible to provide a register for setting the value Th, by means of which a program or a user can set the value Th via an electronic interface. It is further possible to provide a computer program by means of which a user can input or set the value of Th, e.g., by means of an input field or a sliding or rotational controller implemented by software. By means of the control element, the user, be it a human being or a computer program, can control the denoising and can set a desired operation point.

According to the teaching of the EMVA 1288 the noise amplitude of an image sensor depends on the value of brightness. It is assumed there, that the noise of an image sensor is composed of a constant electric noise and a photon noise dependent on the amount of light. Thereby, the noise amplitude is generally lower in dark portions of an image than in bright portions of an image. By knowing the sensor-dependent values of the dark noise and the conversion gain, a noise amplitude assumed for the present brightness can be calculated according to a model and can be used as the value Th for determining Th1 and Th2. Thereby, the values of Th1 and Th2 are selected smaller in dark portions of the image, than in bright portions of the image. This has the advantage that less valuable structural information is removed from the image in dark portions of the image, where less noise is also present. Furthermore, this has the advantage that a suitable value Th is selected without the user having to set it manually or automated.

Various ones of the convolution matrices proposed in the embodiments show systematic similarities. As an example, the convolution matrix FG1cGr is obtained from the average of the convolution matrices FR1cR and FB1cR. Since it saves more resources in general, if an average is calculated from two values determined before, then to apply a convolution matrix on an environment, such systematic similarities can be exploited to further reduce the calculation effort and thus the resource input.

Furthermore, the storage and calculation effort in case of progressive read-out can be reduced by proper exploitation of time-related and spatial relations, so that further resource savings are possible. If the horizontal pixels are transmitted from left to right in such a manner that one pixel is transferred at each clock within the transfer of a row and while neglecting the problems at the edge portion, the values within the environment move one position to the left with each clock. If, for example, the convolution matrix FB1cGr is used and a result of the convolution shall be determined, an average of both right pixels in the convolution matrix, which are provided with a "1", can be generated in a first clock. The result Avg11_1 can then be temporarily stored in a second, a third, a fourth and a fifth clock as Avg11_2, Avg11_3, Avg11_4 and Avg11_5. In the third clock the result then corresponds to the average of both right-sided central pixels provided with a "2", and in the fifth clock to both right-sided pixels provided with a "1". Thus, the value B1cGr which is obtained by application of the convolution matrix FB1cGr can be determined as (Avg11_1+2×Avg11_3+Avg11_5)/4. Furthermore, in the same course and from the same temporarily stored values, the value B1cR which is obtained by application of the convolution matrix FB1cR can be determined as (Avg11_2+Avg11_4)/2. Through these and various other summarizations the number of calculation operations to be performed can be reduced substantially, whereby less resources need to be applied for the calculation.

Figures 34, 35:
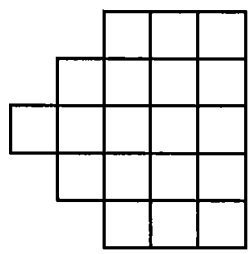
FIG. 34 shows a schematic representation of an example of a reduced environment.
FIG. 35 shows an example of a basic filter for a 9×9 environment.

FIG. 34 shows a schematic representation of an example of a reduced environment. Through the above-mentioned measures it is no longer required to store all values of the environment. FIG. 34 shows which values are actually required for the case of a 5×5 environment, to realize the mathematical image processing processes according to the above-mentioned embodiments. Thereby, further resources can be saved in an advantageous way.

By the solution according to the present invention according to the above described embodiments with monolithic mathematical image processing processes it is possible for the first time to offer a solution to the object in cameras having simpler FPGAs with limited resources, in particular internal memory, the so-called embedded RAM. Cameras having such an FPGA can be produced efficiently and at low production effort.

The proposed image processing processes can also be applied in cameras having a processing unit in which no FPGA is provided as central component, but rather a DSP. The mathematical image processing processes explained in the embodiments for the processing unit of a camera can also be applied in a frame grabber or in a processor of a computer, in case raw data is directly transmitted from the camera, in particular by usage of a software, e.g. a driver, which controls the corresponding process steps.

It is also possible to convert the resulting color value which consists of the color components Rout, Gout and Bout into color values of another color space, e.g., into color components Y, U, V of a color value of the YUV color space. It is further possible to integrate this downstream conversion at an earlier stage in the monolithic mathematical image processing as well.

Furthermore, the skilled person is able to convert the explained teaching to cameras which image sensors are provided with other color patterns (e.g. mosaic filters), which comprise the colors red, green and blue in another arrangement or more or other colors than red, green and blue. Such mosaic filters are described for example in U.S. Pat. No. 5,631,703, U.S. Pat. No. 5,251,019, U.S. Pat. No. 6,330,029 B1 and U.S. Pat. No. 7,057,654 B2. If for example three colors other than red, green and blue are used, these three other colors can be treated mathematically in a way as explained here in connection with red, green and blue. In this case, it is possible to obtain the structural information from a color different than green as well, preferably from such a color which is particularly often provided in the color filter.

If for example four or more colors are used, as in the U.S. Pat. No. 6,330,029, the teaching for red, green and blue as explained here is to be converted to the used four colors and then to be extended to a further color. In this case it is appropriate to calculate the first and second green structural information not only from the values of the color green, but from a combination of colors, as explained for example in the DE 10 2010 052 438 A1.

Also, color filters are known, which comprise the colors red, green, blue and white. To apply the teaching mentioned herein, it is then suggested generating the structural information from the white pixels, since the color white has a particularly favorable signal-to-noise ratio.

To apply the teaching mentioned here to color filters having a spatial period which exceeds the value of two pixels, as for example in the Bayer matrix, it can be required to use an environment larger than a 5×5 environment, so that it is ensured that several pixels are respectively provided in the environment for each color as well that the necessary symmetrical characteristics are observed.

Based on a larger basic filter GF the monolithic mathematical method may also be formulated for environments larger than 5×5, for example for 7×7, 9×9, 15×15 or 31×31. Thereby, image quality can be improved on one side, whereas however, on the other side, memory requirement and calculation effort increase and thus the resource input.

FIG. 35 shows an example of a basic filter for a 9×9 environment. The basic filter GF is indicated here as a convolution matrix based on which the calculation of the other convolution matrices can be performed.

The proposed monolithic mathematical image processing processes comprise several aspects which address several different problems. Depending on the application it can be advantageous to omit certain process steps related to an aspect. It is thus conceivable for example to apply an image sensor which does not show any noteworthy green-green imbalance. In such a case, the correction of the green-green imbalance and thus the determination of the values RXB and BXB, the multipliers 230 and 231, the subtractor 232, the determination of the value CCmax and the selection unit 233 as well as the logic elements 234 and 235 can be omitted. By this omission the calculation effort can be reduced and therefore less resources are required, wherein a possible increase in noise can be prevented through the omitted processing steps.

As an example, it is also conceivable that the digital camera comprises a substantial higher number of pixels than its optic can resolve optically. In such a case, it is often favorable to omit the second structural information GS2, the fine structure of which cannot be reproduced by the optic at all, and thereby omit the calculation of the values GScRB, RBSeRB and GScG, on the multiplier 220, the adder 223, the selection unit 221, the application of the non-linear function 251 and the adder 222. Additionally, also in this case the above-mentioned process steps for correction of the green-green imbalance can be omitted. Thereby, the processing effort can also be reduced and resource can be saved. Furthermore, the omission leads to an advantageous reduction of image noise, which can be explained by the omission of the noise contribution through the error propagation in the process steps for calculating the second structural information.

Furthermore, it is also conceivable that no relevant problems occur in connection with color aliasing in a camera or in an application of such a camera. Then, the calculation of the value AA and the multiplier 190 can be omitted. Hereby, the calculation effort is also reduced in an advantageous manner and resources are saved.

Also, it is conceivable that no image sharpening shall be applied. In this case, the multiplier 240 with the above advantages can be saved.

Similarly, it is also conceivable that other aspects of the monolithic mathematical image processing processes can be saved. Then, the remaining aspects form a mathematical image processing process with mostly less calculation effort and need for resources.

The presented alternative solutions according to the embodiments can be applied in connection with various image recording devices and cameras having a Bayer pattern or similar filter structures.

To summarize, an image processing device has been described for processing image data obtained from a digital camera with an image sensor with a regular pixel arrangement and an associated color filter with Bayer pattern, wherein the image processing device is adapted to carry out all image processing operations with respect to a pixel of interest using image data from a single predetermined environment comprising several pixels.

The invention claimed is:

1. An image processing device for processing image data from an image sensor with a regular pixel arrangement and an associated color filter with Bayer pattern having a first color component green, a second color component red, and a third color component blue, wherein the image processing device carries out image processing operations by using image data from a predetermined environment comprising several pixels with respect to a pixel of interest, wherein the image processing operations perform a shift of the color value parallel to a non-color line of the color space by addition of an identical structural value to all color components of the image data, and wherein the image processing operations determine based on image data of the first color component green of the environment a correction value which is added to the image data of the second color component red and the third color component blue with a different respective sign.

2. The image processing device according to claim 1, wherein the predetermined environment is a quadratic section of at least five rows and five columns of the regular pixel arrangement.

3. The image processing device according to claim 1, wherein the image processing operations determine the correction value by multiplication of a value determined by convolution of the image data of the first color component green by predetermined convolution matrices, by a direction estimation value which depends on a predominant direction of the image structure.

4. The image processing device according to claim 3, wherein the image processing operations determine the value, determined by convolution of the image data of the first color component green, by convolution operations in which rows and columns of the convolution matrices are taken into account at respective alternating signs.

5. The image processing device according to claim 3, wherein the image processing operations determine the direction estimation value based on a difference of changes in brightness in horizontal and vertical directions and by application of convolution matrices on the differences of horizontally and vertically neighboring pixels within the environment and comparison of the results obtained.

6. The image processing device according to claim 5, wherein the convolution matrices are adapted so that in case of horizontally neighboring phase relationships for each row and for each color the row sum of the matrix elements belonging to this color is equal and that in case of vertically neighboring phase relationships for each column and for each color the column sum of the matrix elements belonging to this color is equal.

7. The image processing device according to claim 1, wherein the image processing operations correct a green-green imbalance by offsetting a correction term against a structural information determined from image data of a predetermined color component in the environment.

8. The image processing device according to claim 1, wherein the image processing operations perform an image sharpening by multiplication of a structural information determined from image data of a predetermined color component in the environment by a correction value.

9. A digital camera comprising an image processing device according to claim 1.

10. An image processing device according to claim 1, connected to a digital camera comprising the image sensor.

11. An image processing device for processing image data from an image sensor with a regular pixel arrangement and an associated color filter with Bayer pattern, wherein the image processing device carries out image processing operations by using image data from a predetermined environment comprising several pixels with respect to a pixel of interest, wherein the image processing operations apply a first non-linear function having a first setting value on a first structural information determined from image data of a first color component in the environment, a second non-linear function having a second setting value on a second structural information determined from image data of the predetermined color component in the environment, and to add the results of the first and second non-linear functions to obtain a low-noise structural information, and wherein the image processing operations perform a shift of the color value parallel to a non-color line of the color space by addition of the low-noise structural value to all color components of the image data.

12. The image processing device according to claim 11, wherein the image processing operations determine the second structural information at a phase relationship cG with a central green pixel of the Bayer pattern as green structural information GScG and at a phase relationship cRB with a central red or blue pixel of the Bayer pattern by an estimation incorporating a direction estimation value.

13. An image processing method for processing image data from an image sensor having a regular pixel arrangement and an associated color filter with Bayer pattern having a first color component green, a second color component red, and a third color component blue, wherein the image processing method carries out image processing operations by using image data from a predetermined environment comprising several pixels with respect to a pixel of interest, wherein the image processing operations perform a shift of the color value parallel to a non-color line of the color space by addition of an identical structural value to all color components of the image data, and wherein the image processing operations determine based on image data of the first color component green of the environment a correction value and add it to the image data of the second color component red and the third color component blue with a different respective sign.

14. A computer program product embodied in a non-transitory computer-readable medium for storage on a data carrier and for causing a computer device to perform the image processing method according to claim 13 when the computer program product embodied in the non-transitory computer-readable medium is executed on the computer device.

15. An image processing method for processing image data from an image sensor with a regular pixel arrangement and an associated color filter with Bayer pattern, wherein the image processing method carries out image processing operations by using image data from a predetermined environment comprising several pixels with respect to a pixel of interest, wherein the image processing operations apply a first non-linear function having a first setting value on a first structural information determined from image data of a first color component in the environment, a second non-linear function having a second setting value on a second structural information determined from image data of the predetermined color component in the environment, and add the results of the first and second non-linear functions to obtain a low-noise structural information, and wherein the image processing operations perform a shift of the color value parallel to a non-color line of the color space by addition of the low-noise structural value to all color components of the image data.

16. A computer program product embodied in a non-transitory computer-readable medium for storage on a data carrier and for causing a computer device to perform the image processing method according to claim 15 when the computer program product embodied in the non-transitory computer-readable medium is executed on the computer device.

\* \* \* \* \*